US009423795B2

(12) United States Patent
Araki et al.

(10) Patent No.: US 9,423,795 B2
(45) Date of Patent: Aug. 23, 2016

(54) INVERTED PENDULUM TYPE VEHICLE

(71) Applicant: HONDA MOTOR CO., LTD., Tokyo (JP)

(72) Inventors: Makoto Araki, Wako (JP); Makoto Hasegawa, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 14/225,489

(22) Filed: Mar. 26, 2014

(65) Prior Publication Data

US 2014/0297125 A1 Oct. 2, 2014

(30) Foreign Application Priority Data

Mar. 29, 2013 (JP) ................. 2013-074053

(51) Int. Cl.
| | |
|---|---|
| *B62D 6/00* | (2006.01) |
| *G05D 1/02* | (2006.01) |
| *B62K 3/00* | (2006.01) |
| *B62H 1/12* | (2006.01) |

(52) U.S. Cl.
CPC .............. *G05D 1/0268* (2013.01); *B62H 1/12* (2013.01); *B62K 3/007* (2013.01); *B62K 2207/04* (2013.01)

(58) Field of Classification Search
CPC ...... B62D 6/00; B62D 6/007; B62D 7/1509; B62K 3/007; B62K 2207/00; B62K 2207/02; B62K 2207/04
USPC ............... 701/41, 42, 44; 180/282, 316, 315
See application file for complete search history.

(56) References Cited

U.S. PATENT DOCUMENTS

| | | | |
|---|---|---|---|
| 5,385,210 A | 1/1995 | Harvey | |
| 5,791,425 A | 8/1998 | Kamen et al. | |
| 5,971,091 A * | 10/1999 | Kamen | .............. A61G 5/04 180/218 |
| 6,302,230 B1 * | 10/2001 | Kamen | .............. A63C 17/01 180/171 |
| 6,827,163 B2 | 12/2004 | Amsbury et al. | |
| 6,840,346 B2 * | 1/2005 | Sugitani | .............. B62D 1/12 180/402 |
| 7,690,452 B2 | 4/2010 | Kamen et al. | |

(Continued)

FOREIGN PATENT DOCUMENTS

| | | |
|---|---|---|
| DE | 20 2007 007 673 U1 | 10/2007 |
| EP | 1 529 556 A2 | 5/2005 |

(Continued)

OTHER PUBLICATIONS

Al-Hadithi et al., "Fuzzy Optimal Control for Double Inverted Pendulum", 7th IEEE Conference on Industrial Electronics and Applications (ICIEA), 2012, pp. 1-5.

(Continued)

*Primary Examiner* — Thomas G Black
*Assistant Examiner* — Sara Lewandroski
(74) *Attorney, Agent, or Firm* — Birch, Stewart, Kolasch & Birch, LLP

(57) ABSTRACT

An inverted pendulum type vehicle configured to enable a user to control the vehicle by selecting a single control mode, even while other control modes are not selected. One control mode out of plural control modes of the vehicle is selected based on a detection result of an inclination state of an occupant riding section by an inclination sensor that is a fundamental constituent of the vehicle. Motion of a first actuator device and a second actuator device is controlled according to the one control mode selected.

9 Claims, 9 Drawing Sheets

(56) References Cited

U.S. PATENT DOCUMENTS

| | | | |
|---|---|---|---|
| 7,740,099 B2* | 6/2010 | Field | A63C 17/01 180/282 |
| 7,963,352 B2 | 6/2011 | Alexander | |
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2* | 11/2013 | Akimoto | B60L 15/20 180/21 |
| 8,751,110 B2 | 6/2014 | Takenaka et al. | |
| 8,758,191 B2 | 6/2014 | Takenaka et al. | |
| 9,037,331 B2 | 5/2015 | Taira et al. | |
| 9,085,334 B2 | 7/2015 | Hoffmann et al. | |
| 2001/0032743 A1 | 10/2001 | Kamen et al. | |
| 2002/0023787 A1* | 2/2002 | Kamen | A61G 5/04 180/7.1 |
| 2004/0069543 A1 | 4/2004 | Kamen et al. | |
| 2004/0201271 A1 | 10/2004 | Kakinuma et al. | |
| 2005/0121238 A1 | 6/2005 | Ishii | |
| 2005/0121866 A1 | 6/2005 | Kamen et al. | |
| 2005/0126833 A1 | 6/2005 | Takenaka et al. | |
| 2007/0084662 A1 | 4/2007 | Oikawa | |
| 2007/0158117 A1 | 7/2007 | Alexander | |
| 2007/0251735 A1 | 11/2007 | Kakinuma et al. | |
| 2007/0296170 A1 | 12/2007 | Field et al. | |
| 2008/0161990 A1 | 7/2008 | Gansler | |
| 2008/0245594 A1 | 10/2008 | Ishii et al. | |
| 2008/0271938 A1 | 11/2008 | Gulak | |
| 2009/0055033 A1 | 2/2009 | Gansler et al. | |
| 2009/0105908 A1 | 4/2009 | Casey et al. | |
| 2009/0288900 A1 | 11/2009 | Takenaka et al. | |
| 2010/0017069 A1 | 1/2010 | Miki et al. | |
| 2010/0030440 A1 | 2/2010 | Kosaka | |
| 2010/0030441 A1 | 2/2010 | Kosaka | |
| 2010/0030442 A1 | 2/2010 | Kosaka | |
| 2010/0038960 A1 | 2/2010 | Takenaka et al. | |
| 2010/0070132 A1 | 3/2010 | Doi | |
| 2010/0071984 A1 | 3/2010 | Doi et al. | |
| 2010/0096905 A1 | 4/2010 | Takenaka et al. | |
| 2010/0114420 A1 | 5/2010 | Doi | |
| 2010/0114421 A1 | 5/2010 | Doi | |
| 2010/0114468 A1 | 5/2010 | Field et al. | |
| 2010/0152987 A1 | 6/2010 | Gorai | |
| 2010/0168993 A1* | 7/2010 | Doi | B60L 15/00 701/124 |
| 2010/0235028 A1 | 9/2010 | Ishii | |
| 2010/0299044 A1 | 11/2010 | Miyake et al. | |
| 2011/0006498 A1 | 1/2011 | Mercier | |
| 2011/0010066 A1 | 1/2011 | Fuwa | |
| 2011/0035101 A1 | 2/2011 | Kawada et al. | |
| 2011/0060518 A1 | 3/2011 | Kosaka | |
| 2011/0067936 A1 | 3/2011 | Takenaka et al. | |
| 2011/0070998 A1 | 3/2011 | Takenaka et al. | |
| 2011/0071714 A1 | 3/2011 | Takenaka | |
| 2011/0071715 A1 | 3/2011 | Akimoto et al. | |
| 2011/0071752 A1 | 3/2011 | Takenaka et al. | |
| 2011/0098884 A1 | 4/2011 | Doi | |
| 2011/0118968 A1 | 5/2011 | Takenaka et al. | |
| 2011/0130925 A1* | 6/2011 | Oikawa | B60L 15/2036 701/41 |
| 2011/0166713 A1 | 7/2011 | Tsuji et al. | |
| 2011/0209929 A1 | 9/2011 | Heinzmann et al. | |
| 2011/0209932 A1 | 9/2011 | Takenaka et al. | |
| 2011/0213522 A1 | 9/2011 | Stevens et al. | |
| 2011/0233989 A1 | 9/2011 | Takenaka et al. | |
| 2011/0264350 A1 | 10/2011 | Doi | |
| 2012/0046856 A1 | 2/2012 | Doi | |
| 2012/0123647 A1 | 5/2012 | Doi et al. | |
| 2012/0166048 A1 | 6/2012 | Inoue et al. | |
| 2012/0173041 A1 | 7/2012 | Takenaka et al. | |
| 2012/0173042 A1 | 7/2012 | Takenaka et al. | |
| 2012/0173086 A1 | 7/2012 | Takenaka et al. | |
| 2012/0217072 A1 | 8/2012 | Hoffmann et al. | |
| 2012/0232757 A1 | 9/2012 | Oikawa | |
| 2013/0133959 A1 | 5/2013 | Kamiyama et al. | |
| 2013/0299254 A1 | 11/2013 | Mutoh et al. | |
| 2013/0299263 A1 | 11/2013 | Shimizu et al. | |
| 2014/0188338 A1 | 7/2014 | Ito et al. | |
| 2014/0236426 A1 | 8/2014 | Kosaka et al. | |
| 2014/0330507 A1 | 11/2014 | Oikawa | |

FOREIGN PATENT DOCUMENTS

| | | | |
|---|---|---|---|
| EP | 1 632 428 A1 | 3/2006 | |
| EP | 2 045 180 A1 | 4/2009 | |
| EP | 2 052 924 A1 | 4/2009 | |
| EP | 2 163 467 A1 | 3/2010 | |
| EP | 2 319 750 A1 | 5/2011 | |
| GB | 2242173 A | 9/1991 | |
| JP | 2004/129435 A | 4/2004 | |
| JP | 4181113 B2 | 11/2008 | |
| JP | 2010-167807 | 8/2010 | |
| JP | 2010-167808 A | 8/2010 | |
| JP | 2011-57111 A | 3/2011 | |
| JP | 2011-63183 A | 3/2011 | |
| JP | 2011/063183 A | 3/2011 | |
| JP | 2011-63241 A | 3/2011 | |
| JP | 2011-63243 A | 3/2011 | |
| JP | 2011-68222 A | 4/2011 | |
| TW | M424290 U1 | 3/2012 | |
| WO | WO 02/30730 A2 | 4/2002 | |
| WO | WO 0230730 A1 * | 4/2002 | A63C 17/12 |
| WO | WO 0230730 A2 * | 4/2002 | A63C 17/12 |
| WO | WO 2008/132778 A1 | 11/2008 | |
| WO | WO 2008/132779 A1 | 11/2008 | |
| WO | WO 2010/113439 A1 | 10/2010 | |
| WO | WO 2011/033575 A1 | 3/2011 | |
| WO | WO 2012/017335 A1 | 2/2012 | |

OTHER PUBLICATIONS

Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).

Ghorbani et al., "Fault tolerant improvement with chaos synchronization using Fuzzy-PID control", 13th Iranian Conference on Fuzzy Systems (IFSC), IEEE, 2013, 5 pages.

Jiang et al., "High Gain Disturbance Observer and Its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and Its Application", Proceedings of 2014 IEEE International Conference on Mechatronics and Automation, Aug. 3-6, 2014, pp. 1745-1750.

U.S. Notice of Allowance, issued Feb. 25, 2015, for U.S. Appl. No. 14/273,075.

U.S. Office Action, issued Feb. 24, 2015, for U.S. Appl. No. 14/223,360.

U.S. Office Action, dated Sep. 3, 2015, for U.S. Appl. No. 14/223,360.

European Office Communication for European Application No. 14161447.9, dated Jul. 23, 2015.

Notice of Allowance dated Feb. 2, 2016 issued in related U.S. Appl. No. 14/225,777.

Notice of Allowance dated Apr. 4, 2016 mailed in co-pending U.S. Appl. No. 14/225,471.

(56) References Cited

OTHER PUBLICATIONS

U.S. Office Action for U.S. Appl. No. 14/225,471, dated Oct. 1, 2015.
U.S. Office Action for U.S. Appl. No. 14/225,777, dated Oct. 5, 2015.
U.S. Office Action, dated Oct. 9, 2015, for U.S. Appl. No. 14/246,846.
U.S. Office Action, dated Jan. 25, 2016, for U.S. Appl. No. 14/244,279.
Extended European Search Report for Application 14169797.9 dated Oct. 7, 2014.
Extended European Search Report for Application 14169800.1 dated Oct. 7, 2014.
U.S. Appl. No. 14/225,593, filed Mar. 26, 2014.
U.S. Appl. No. 14/225,471, filed Mar. 26, 2014.
U.S. Appl. No. 14/225,777, filed Mar. 26, 2014.
U.S. Appl. No. 14/225,564, filed Mar. 26, 2014.
U.S. Appl. No. 14/223,360, filed Mar. 24, 2014.
U.S. Appl. No. 14/246,846, filed Apr. 7, 2014.
U.S. Appl. No. 14/244,279, filed Apr. 3, 2014.
U.S. Appl. No. 14/273,075, filed May 8, 2014.

\* cited by examiner

INVERTED PENDULUM TYPE VEHICLE

CROSS-REFERENCE TO RELATED APPLICATION

The present application claims priority under 35 U.S.C. §119 to Japanese Patent Application No. 2013-074053, filed Mar. 29, 2013. The entire contents of the above-identified application is hereby incorporated by reference.

BACKGROUND OF THE INVENTION

1. Field of the Invention

The present invention relates to an inverted pendulum type vehicle that is configured to be capable of moving in all directions on a floor surface.

2. Description of Background Art

In a traveling device in which inversion control is executed by drive control of a wheel, a technology for making a user select the control mode has been proposed JP-A No. 2010-167807

However, according to the technology, as a configuration for making a user select the control mode of a vehicle, it is necessary to arrange a switch separately.

SUMMARY AND OBJECTS OF THE INVENTION

The object of the present invention is to provide an inverted pendulum type vehicle having a function for making a user select the control mode even while additional configuration for mode selection is omitted.

The present invention is related to an inverted pendulum type vehicle (may be hereinafter simply referred to as a "vehicle") that includes moving motion units configured to be capable of moving in all directions on a floor surface, actuator devices that drive the moving motion units, a base that incorporates the moving motion units and the actuator devices, an occupant riding section incorporated into the base so as to be tiltable with respect to the vertical direction (e.g: an imaginary line that extends orthogonally with respect to the floor surface), state detection units that detect a state of the occupant riding section, and a control device configured to control the motion of the actuator devices based on a detection result of the state of the occupant riding section by the state detection units.

The control device is configured to select one control mode out of a plurality of control modes of the inverted pendulum type vehicle based on the detection result of the state of the occupant riding section by the state detection units, and to control the motion of the actuator devices according to the one control mode.

According to the vehicle of the present invention, one control mode is selected by the control device out of a plurality of control modes according to the detection result of the state of the occupant riding section by the state detection units that are fundamental constituents. Therefore, the user can select the control mode by adjusting the state of the occupant riding section even while an additional configuration for mode selection in the vehicle is omitted. The manufacturing cost of the vehicle can be reduced also by the amount of the additional configuration that is omitted.

In the vehicle of the present invention, it is preferable that the control device is configured to select the one control mode with a provision that the detection result of the state of the occupant riding section by the state detection units satisfies a designated condition.

According to the vehicle of the present invention, the user can select the control mode by adjusting the tilting state of the base in a form the detection result of the state of the occupant riding section satisfies a designated condition. Even if the state of the occupant riding section is changed, when the detection result of the state of the occupant riding section achieved by the change does not satisfy the designated condition, the control mode is not selected. Therefore, the possibility that the state of the occupant riding section changes to an unexpected form and a control mode not intended by the user is selected is reduced.

In the vehicle of the present invention, it is preferable that the control device is configured to select the one control mode with the designated condition that the detection result of the state of the occupant riding section by the state detection units shows tilting of the occupant riding section to a designated direction.

According to the vehicle of the present invention, the user can select the control mode by tilting the occupant riding section to a designated direction. Even if the occupant riding section is tilted, when the tilting direction is a direction different from the designated direction, the control mode is not selected. Therefore, the possibility that the occupant riding section tilts to an unexpected direction and a control mode not intended by the user is selected is reduced.

In the vehicle of the present invention, it is preferable that the control device is configured to select the one control mode with the designated condition that the detection result of the state of the occupant riding section by the state detection units shows tilting of the occupant riding section to the designated direction by a designated angle or more.

According to the vehicle of the present invention, the user can select the control mode by tilting the occupant riding section to a designated direction by a designated angle or more. Even if the occupant riding section is tilted to the designated direction, when the tilting angle is less than the designated angle, the control mode is not selected. Therefore, the possibility that the occupant riding section tilts to a designated direction unexpectedly and a control mode not intended by the user is selected is further reduced.

In the vehicle of the present invention, it is preferable that the control device is configured to select a control mode that differs according to whether the designated direction is forward or rearward as the one control mode.

According to the vehicle of the present invention, each of the forward direction whose instruction frequency as the translational direction by the user is high and the rearward direction whose instruction frequency is lower than that of the forward direction is defined as the tilting direction (designated direction) of the occupant riding section for control mode selection. Therefore, the user can clearly recognize the difference in the selected control mode according to the difference in the tilting direction of the occupant riding section in view of the high-low difference in the frequency and surely select the control mode intended by the user.

Therefore, it is preferable that the control device is configured to select the one control mode out of the plurality of control modes that include a beginner mode in which the motion of the actuator devices is controlled with low sensitivity with respect to steering operation of the inverted pendulum type vehicle by an occupant, and an expert mode in which the motion of the actuator devices is controlled with sensitivity higher than that in the beginner mode with respect to steering operation of the inverted pendulum type vehicle by the occupant.

According to the vehicle of the present invention, it is possible to make the occupant select each of the "expert mode" and the "beginner mode" as the control mode of the vehicle according to the difference of the tilting condition of the occupant riding section. Also, it is possible to make the occupant steer the vehicle with different sensitivity according to the selected control mode with respect to the steering operation of the occupant.

Therefore, it is preferable that the control device is configured to select the one control mode based on the detection result of the state of the occupant riding section by the state detection units over a period from start of the inverted pendulum type vehicle until a designated period elapses.

According to the vehicle of the present invention, because the user can start of the vehicle 1 and select the control mode by tilting of the occupant riding section in succession, usability of the vehicle can be improved. Such an event can be avoided that an unintended mode is selected by tilting of the occupant riding section in a state where the user is riding on the occupant riding section as an occupant after the designated period.

Therefore, it is preferable that the control device is configured to select one control mode out of the plurality of control modes based on a detection result other than the detection result of the state of the occupant riding section by the state detection units which become a motion control basis of the actuator devices.

According to the vehicle of the present invention, the detection result of the state of the occupant riding section used as the motion control basis of the actuator devices is not used as the selection basis of the control mode. Similarly, the detection result of the state of the occupant riding section used as the selection basis of the control mode is not used as the motion control basis of the actuator devices. Thus, not only is the control mode selected based on a common detection result of the state of the occupant riding section, but also such an event can be avoided that the control condition of the motion of the actuator devices changes according to the selected control mode and discontinuity occurs in the steering feeling of the vehicle by the occupant.

Therefore, it is preferable that an indicator is further included and that the control device is configured to display the one control mode on the indicator.

According to the vehicle of the present invention, by making the user visually confirm the display condition of the indicator, the user can easily confirm the control mode of the vehicle according to the display condition.

Therefore, it is preferable that the indicator is disposed on the front side of the base.

According to the vehicle of the present invention, even in a state where the user rides on the occupant riding section as an occupant, the user can easily confirm the control mode of the vehicle.

Therefore, it is preferable that the indicator is formed of a plurality of monochrome LEDs, a multicolor LED, or a combination thereof, and the control device is configured to execute control while differentiating the lighting condition of the plurality of monochrome LEDs, the multicolor LED, or a combination thereof according to difference in the one control mode.

According to the vehicle of the present invention, by making the user visually confirm the lighting condition of a plurality of monochrome LEDs, a multicolor LED, or a combination thereof as the indicator, the user can easily confirm the control mode of the vehicle according to the display condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 (b) is a block diagram showing processing of an essential part of the second control processing unit in the third embodiment of the present invention.

DETAILED DESCRIPTION OF THE PREFERRED EMBODIMENTS

First Embodiment

Figure 1:
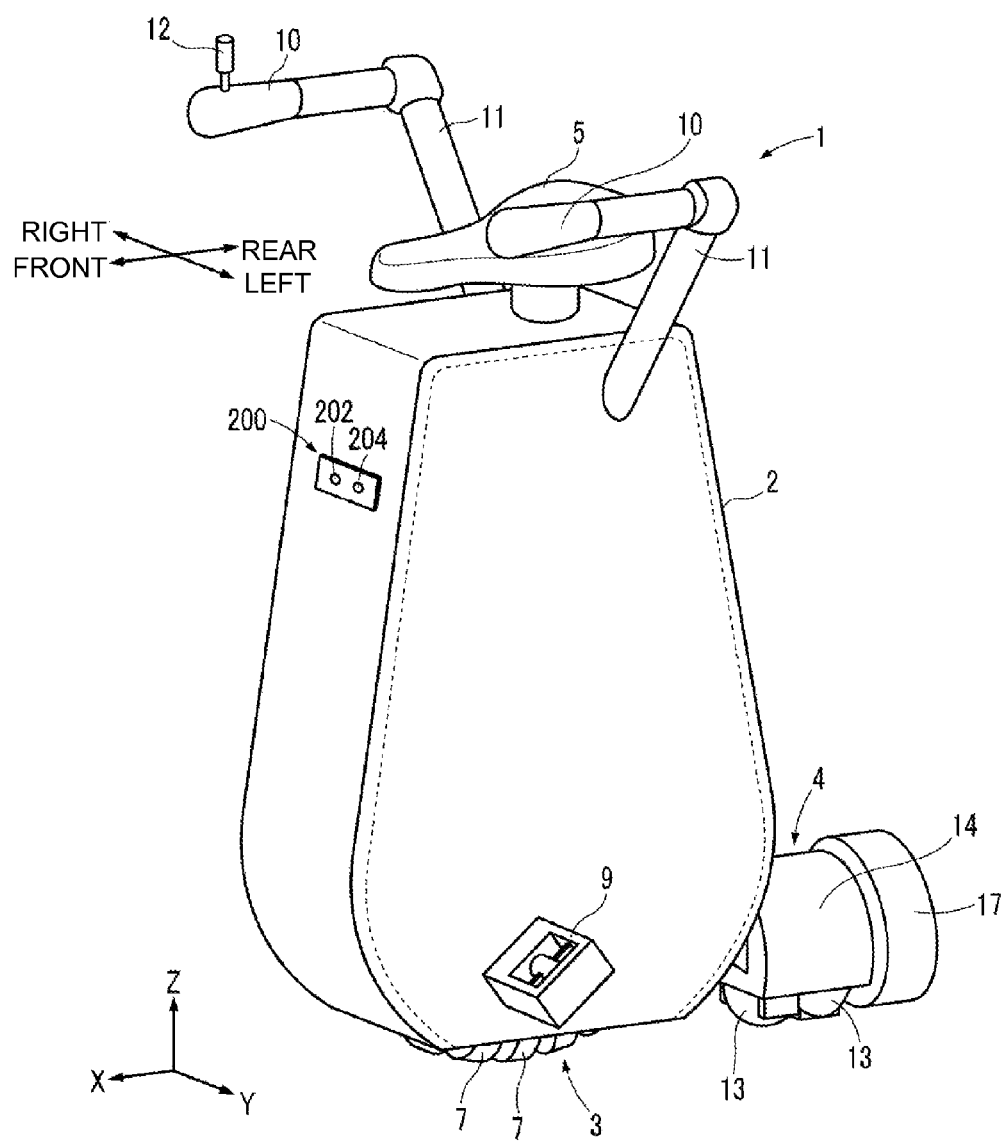
FIG. 1 is a perspective view of the outer appearance of the inverted pendulum type vehicle of the first embodiment of the present invention.
Figure 2:
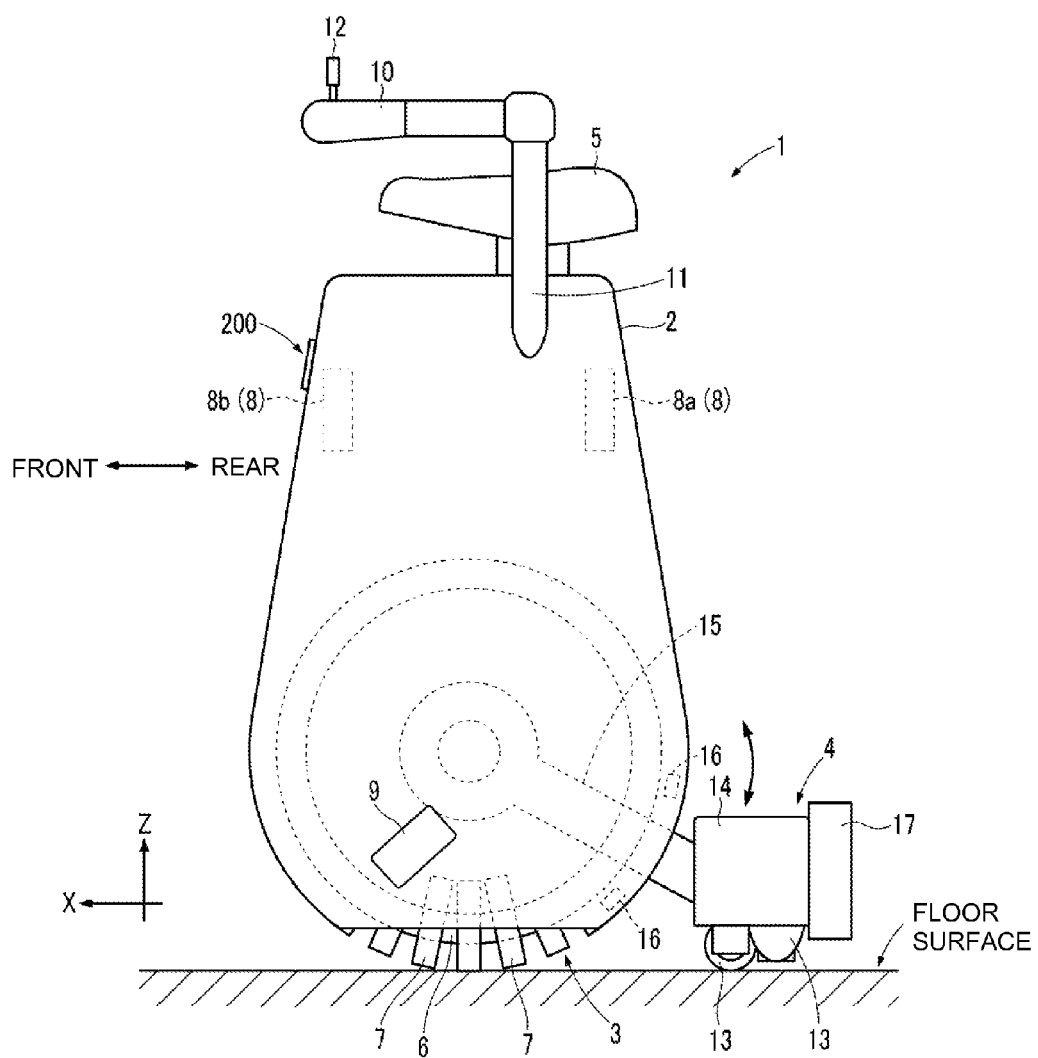
FIG. 2 is a side view of the inverted pendulum type vehicle of the first embodiment.

The first embodiment of the present invention will be described referring to FIG. 1 to FIG. 8 and FIG. 10. As shown in FIG. 1 and FIG. 2, an inverted pendulum type vehicle 1 of the present embodiment includes a base 2, a first moving motion unit 3 and a second moving motion unit 4 capable of moving on a floor surface, and an occupant riding section 5 on which an occupant rides. The vehicle 1 includes an indicator 200 disposed on the front side of the base 2 and outputting the difference in the control mode of the vehicle 1 selected then according to the difference in the display condition. In the present embodiment, the indicator 200 is formed of a red color LED 202 and a green color LED 204.

The first moving motion unit 3 includes a core body 6 of an annular shape shown in FIG. 2 (hereinafter referred to as an annular core body 6), and plural rollers 7 of an annular shape mounted on the annular core body 6 so as to be arrayed at equal angular intervals in the circumferential direction (the direction around the axis) of the annular core body 6. The respective rollers 7 are externally inserted to the annular core body 6 with their rotation axes being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and plural rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves to the direction orthogonal to the axis of the annular core body 6 and the direction inclined with respect to the axial direction of the annular core body 6.

Thus, the first moving motion unit 3 can move to all direction on the floor surface. In the description below, as shown in FIG. 1 and FIG. 2, out of the moving directions of the first moving motion unit 3, the direction orthogonal to the axis of the annular core body 6 is made the X-axis direction, the axial direction of the annular core body 6 is made the Y-axis direction, and the vertical direction (e.g: an imaginary line that extends orthogonally with respect to the floor surface), is made the Z-axis direction. Also, the forward direction is made the positive direction of X-axis, the leftward direction is made the positive direction of Y-axis, and the upward direction is made the positive direction of Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, a first actuator device 8 that generates a drive force for moving the first moving motion unit 3 is mounted. The first actuator device 8 is formed of an electric motor 8a as an actuator rotationally driving the annular core body 6 and an electric motor 8b as an actuator rotationally driving the respective rollers 7. Further, it is configured that the electric motors 8a, 8b impart rotational drive force to the annular core body 6 and the respective rollers 7 through power transmission mechanisms whose illustrations are omitted. Also, the power transmission mechanisms may have a known structure.

The first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 (saddle seat) is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction integrally with the base 2. That is, the tilting condition or the rotating condition (around the Yaw axis) of the occupant riding section 5 and the tilting condition or the rotating condition of the base 2 are measured as equivalent ones.

The first moving motion unit 3 and the base 2 may be configured so as not to be tilted around X-axis and Y-axis (so that the attitude in the pitching direction and the rolling direction is maintained generally constant). In this case, it may configured that the occupant riding section 5 is supported by the base 2 so as to be tiltable or rotatable through a ball joint and the like. That is, the tilting condition or the rotating condition of the occupant riding section 5 and the tilting condition or the rotating condition of the base 2 are measured as separate ones.

A pair of footrests 9, 9 on which the occupant sitting on the occupant riding section 5 places the occupant's feet and a pair of holders 10, 10 held by the occupant are further incorporated into the base 2.

The footrests 9, 9 are arranged projectingly in the lower part of both sides of the base 2. Also, in FIG. 1 and FIG. 2, illustration of the footrest 9 on one side (right side) is omitted.

Further, the holders 10, 10 are ones having a bar shape disposed so as to extend in the X-axis direction (front/rear direction) on both sides of the occupant riding section 5 and are respectively fixed to the base 2 through rods 11 extended from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

In the present embodiment, the second moving motion unit 4 is formed of a so-called omni-wheel. The omni-wheel as the second moving motion unit 4 has a known structure including a pair of coaxial annular core bodies (illustration thereof is omitted) and a plurality of barrel-like rollers 13 externally inserted so as to be rotatable with the rotation axis being directed to the circumferential direction of the annular core bodies in the respective annular core bodies.

In this case, the second moving motion unit 4 is disposed on the rear side of the first moving motion unit 3 with the axis of the pair of annular core bodies being directed to the X-axis direction (front/rear direction), and is grounded to the floor surface through the rollers 13.

The roller 13 on one side and the roller 13 on the other side of the pair of annular core bodies are disposed so as to shift the phase in the circumferential direction of the annular core bodies, and it is configured that either one of the roller 13 on one side and the roller 13 on the other side of the pair of annular core bodies is grounded to the floor surface when the pair of annular core bodies rotate.

The second moving motion unit 4 formed of the omni-wheel is connected to the base 2. More specifically, the second moving motion unit 4 includes a case 14 that covers a portion on the upper side of the omni-wheel (the entirety of the pair of annular core bodies and the plural rollers 13), and the pair of annular core bodies of the omni-wheel are journaled to the case 14 so as to be rotatable around the axis of the pair of annular core bodies. Also, an arm 15 extended from the case 14 to the base 2 side is journaled to the base 2 so as to be swingable around the axis of the annular core bodies 6 of the first moving motion unit 3. Thus, the second moving motion unit 4 is connected to the base 2 through the arm 15.

Also, the second moving motion unit 4 is made swingable with respect to the base 2 around the axis of the annular core bodies 6 of the first moving motion unit 3 by swinging of the arm 15, and thereby, the occupant riding section 5 is made capable of tiltable around Y-axis along with the base 2 while both of the first moving motion unit 3 and the second moving motion unit 4 are grounded.

It may be also configured that the arm 15 is journaled to the axis section of the annular core bodies 6 of the first moving motion unit 3 and the second moving motion unit 4 is connected to the first moving motion unit 3 through the arm 15.

Also, in the base 2, a pair of stoppers 16, 16 that restrict the swing range of the arm 15 is arranged, and the arm 15 can swing within a range between the stoppers 16, 16. Thus, it is configured that the swing range of the second moving motion unit 4 around the axis of the annular core bodies 6 of the first moving motion unit 3 as well as the swing range of the base 2 and the occupant riding section 5 around X-axis are restricted, and the base 2 and the occupant riding section 5 are prevented from tilting excessively to the rear side of the occupant.

The second moving motion unit 4 may be energized by a spring so as to be pressed to the floor surface.

As described above, similarly to the first moving motion unit 3, the second moving motion unit 4 can move on the floor surface in all direction including the X-axis direction and the Y-axis direction by executing either one or both of rotation of the pair of annular core bodies of the second moving motion unit 4 and rotation of the rollers 13. More specifically, the second moving motion unit 4 is made movable in the Y-axis direction (right/left direction) by rotation of the annular core bodies, and is made movable in the X-axis direction (front/rear direction) by rotation of the rollers 13.

Also, to the case 14 of the second moving motion unit 4, an electric motor 17 as the second actuator device that drives the second moving motion unit 4 is attached. So as to rotationally drive a pair of annular core bodies of the second moving motion unit 4, the electric motor 17 is connected to the pair of annular core bodies.

Therefore, in the present embodiment, it is configured that the second moving motion unit 4 is moved in the X-axis direction in a subordinate manner following the movement of the first moving motion unit 3 in the X-axis direction, and the second moving motion unit 4 is moved in the Y-axis direction by rotatingly driving the pair of annular core bodies of the second moving motion unit 4 by the electric motor 17.

In addition, the second moving motion unit 4 may have a structure similar to that of the first moving motion unit 3.

The above is the mechanical configuration of the vehicle 1 in the present embodiment.

Figure 3:
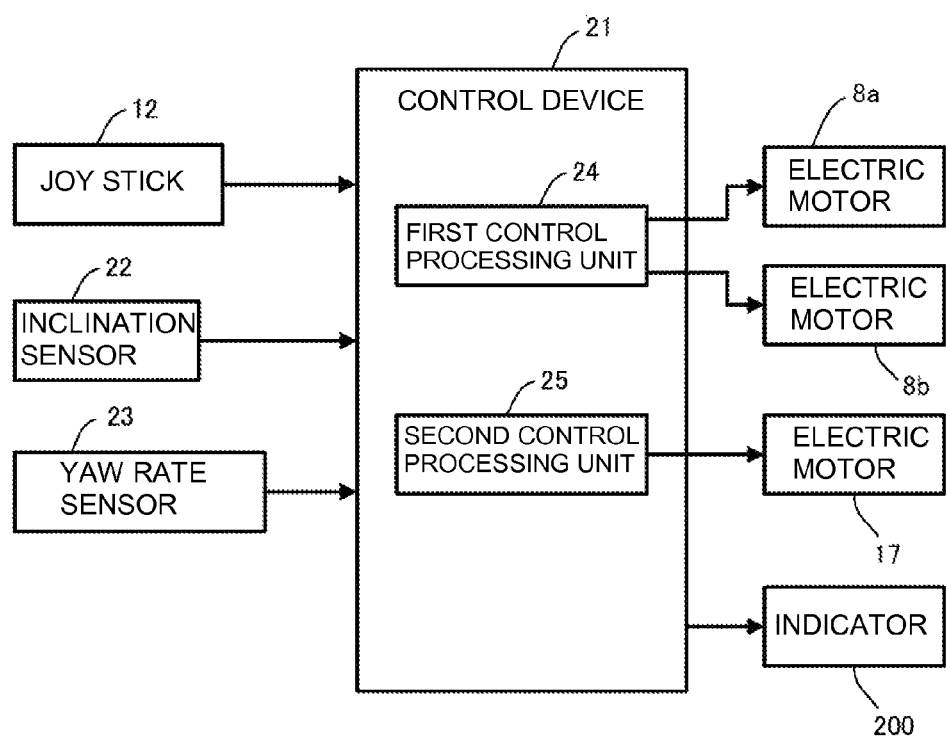
FIG. 3 is a block diagram showing a configuration for controlling the inverted pendulum type vehicle of the first embodiment.

Although illustration in FIG. 1 and FIG. 2 is omitted, on the base 2 of the vehicle 1 in the present embodiment, as a configuration for motion control of the vehicle 1 (motion control of the first moving motion unit 3 and the second moving motion unit 4), as shown in FIG. 3, a control device 21 formed of an electronic circuit unit including CPU, RAM, ROM and the like, an inclination sensor 22 for measuring the inclination angle of the occupant riding section 5 (the inclination angle of the base 2) with respect to the vertical direction (e.g: an imaginary line that extends orthogonally with respect to the floor surface), and a yaw rate sensor 23 for measuring the angular velocity around the yaw axis of the vehicle 1 are mounted.

Also, it is configured that the output of the joy stick 12 and the detection signals of the inclination sensor 22 and the yaw rate sensor 23 are inputted to the control device 21. The input signals are stored as the data in a storage device that forms the control device 21. The data stored by the storage device may be accumulated, but may be updated or overwritten for every inputting.

The control device 21 is configured to select one control mode out of plural control modes of the vehicle 1 according to the detection result of the inclination state of the occupant riding section 5 (or the base 2) expressed by the output signal of the inclination sensor 22 that forms a "state detection unit". The control device 21 is configured to control the motion of the electric motors 8*a* and 8*b* according to the one control mode selected. The control device 21 is configured to make the one control mode selected be displayed on the indicator 200.

"The control device 21 is "configured" to execute predetermined calculating process" means that the calculation processing device of one or plural CPUs and the like forming the control device 21 is "programmed" or "designed" so as to execute the predetermined calculation process or to output required signals according to the reading software after required application software and required data are read from the storage device such as ROM or RAM and the like.

Also, the control device 21 may be formed into plural electronic circuit units that are capable of communicating to each other.

The inclination sensor 22 is formed of an acceleration sensor and an angular velocity sensor such as a gyro-sensor and the like for example. Also, the control device 21 acquires the measured value of the inclination angle of the occupant riding section 5 (that is the inclination angle of the base 2) from the detection signals of these acceleration sensor and angular velocity sensor using a known method. As the method, a method described in Japanese Patent No. 4181113 may be employed for example.

Also, more specifically, the inclination angle of the occupant riding section 5 (or the inclination angle of the base 2)

in the present embodiment is the inclination angle that makes the attitude of the occupant riding section 5 (or the base 2), in a state where the gravity center of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Further, the control device 21 includes a first control processing unit 24 controlling the moving motion of the first moving motion unit 3 by controlling the electric motors 8a, 8b that form the first actuator device 8 and a second control processing unit 25 controlling the moving motion of the second moving motion unit 4 by controlling the electric motor 17 as the second actuator device in addition to the function for acquiring the measured values as described above as a function achieved by a mounted program and the like (function achieved by software) or a function formed by hardware.

By executing the calculation process described below, the first control processing unit 24 calculates the first target speed that is a target value of the moving speed of the first moving motion unit 3 (more specifically, a set of the translational speed in the X-axis direction and the translational speed in the Y-axis direction) one by one, and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

By executing the calculation processing described below, the second control processing unit 25 calculates the second target speed that is a target value of the moving speed of the second moving motion unit 4 (more specifically, the translational speed in the Y-axis direction) one by one, and controls the rotational speed of the electric motor 17 so that the actual moving speed of the second moving motion unit 4 in the Y-axis direction agrees to the second target speed.

In this case, similarly to the case of the first moving motion unit 3, the relation between the rotational speed of the electric motor 17 and the actual moving speed of the second moving motion unit 4 in the Y-axis direction is determined beforehand, and it is configured that the target value of the rotational speed of the electric motor 17 is decided according to the second target speed of the second moving motion unit 4. Also, by feedback-control of the rotational speed of the electric motor 17 to the target value decided according to the second target speed, the actual moving speed of the second moving motion unit 4 in the Y-axis direction is controlled to the second target speed.

In addition, in the present embodiment, the second moving motion unit 4 is moved in the X-axis direction in a subordinate manner following the movement of the first moving motion unit 3 in the X-axis direction. Therefore, it is not necessary to set the target value of the moving speed of the second moving motion unit 4 in the X-axis direction.

Next, processing of the first control processing unit 24 and the second control processing unit 25 will be described in more detail. First, processing of the first control processing unit 24 will be described referring to FIG. 4 to FIG. 7.

Figure 4:
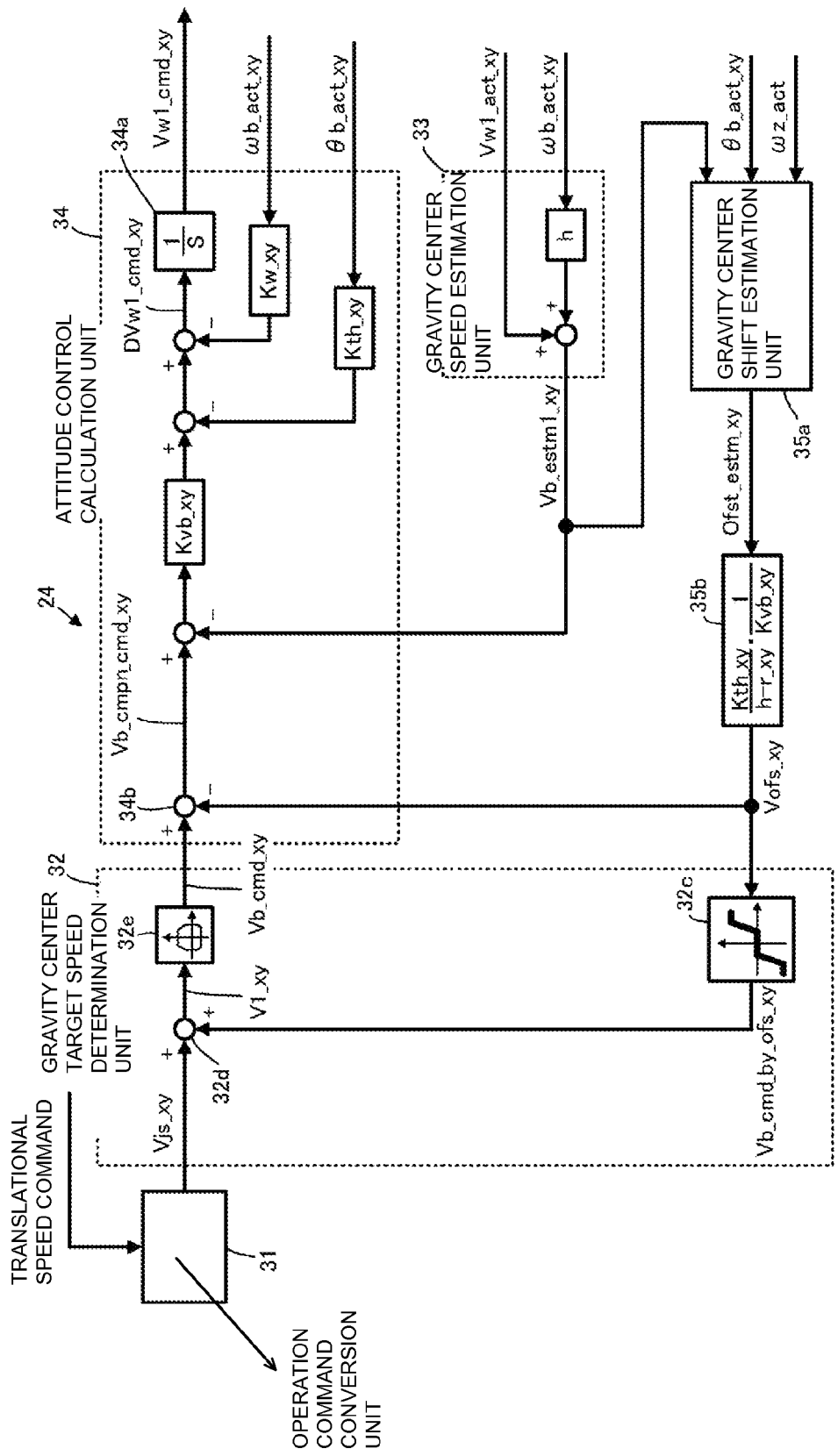
FIG. 4 is a block diagram showing processing of the first control processing unit shown in FIG. 3.

As shown in FIG. 4, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a gravity center target speed determination unit 32 that determines the target speed of the gravity center of the entirety including the vehicle 1 and the occupant riding on the occupant riding section 5 thereof (hereinafter referred to as the vehicle system entirety gravity center), a gravity center speed estimation unit 33 that estimates the speed of the vehicle system entirety gravity center, and an attitude control calculation unit 34 that determines the target value of the moving speed of the first moving motion unit 3 so as to control the attitude of the occupant riding section 5 (the attitude of the base 2) while making the speed of the vehicle system entirety gravity center estimated follow the target speed. Also, the first control processing unit 24 executes processing of these respective function units at a predetermined calculation processing period of the control device 21.

Further, in the present embodiment, the vehicle system entirety gravity center has a meaning as an example of the representative point of the vehicle 1. Therefore, the speed of the vehicle system entirety gravity center means the moving speed of the representative point of the vehicle 1.

Figure 5:
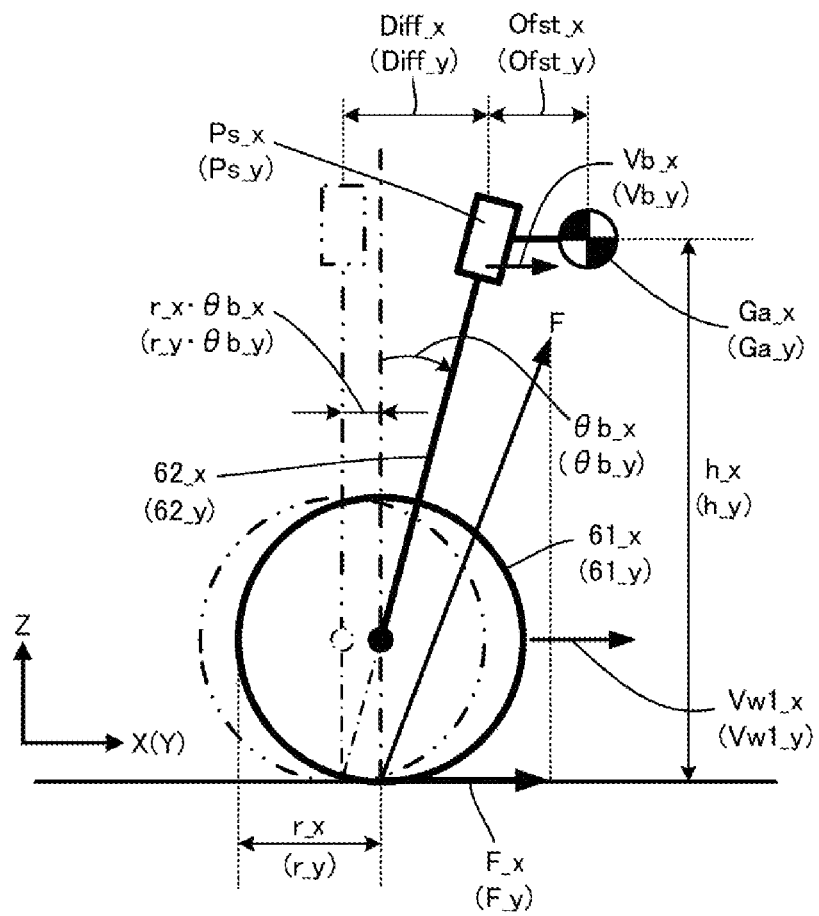
FIG. 5 is a drawing for explaining an inverted pendulum model used for processing of the first control processing unit shown in FIG. 3.

Here, before processing of the respective function units of the first control processing unit 24 is described specifically, facts that become the base of the processing will be described. The dynamic behavior of the vehicle system entirety gravity center (more specifically, the behavior as viewed in the Y-axis direction and the behavior as viewed in the X-axis direction) is approximately expressed by the behavior of an inverted pendulum model as shown in FIG. 5. The algorithm of the processing of the first control processing unit 24 is constructed on the basis of this behavior.

Also, including the reference signs in FIG. 5, in the description below, the suffix "_x" means the reference sign of the variables and the like as viewed from the Y-axis direction, and the suffix "_y" means the reference sign of the variables and the like as viewed from the X-axis direction. Further, in FIG. 5, in order to illustrate both of the inverted pendulum model as viewed from the Y-axis direction and the inverted pendulum model as viewed from the X-axis direction, the reference signs of the variables as viewed from the Y-axis direction is not in parentheses, and the reference signs of the variables as viewed from the X-axis direction is in parentheses.

The inverted pendulum model expressing the behavior of the vehicle system entirety gravity center as viewed from the Y-axis direction includes an imaginary wheel 61_x having the rotation axis parallel to the Y-axis direction and rollable on the floor surface (hereinafter referred to as the imaginary wheel 61_x), a rod 62_x extended from the rotation center of the imaginary wheel 61_x and swingable around the rotation axis of the imaginary wheel 61_x (in the direction around Y-axis), and a mass point Ga_x connected to a reference Ps_x that is the distal end (upper end) of the rod 62_x.

In the inverted pendulum model, the motion of the mass point Ga_x is equivalent to the motion of the vehicle system entirety gravity center as viewed from the Y-axis direction, and the inclination angle θb_x (the inclination angle in the direction around Y-axis) of the rod 62_x with respect to the vertical direction agrees to the inclination angle in the direction around Y-axis of the occupant riding section 5 (or the base 2). Also, the translational motion in the X-axis direction of the first moving motion unit 3 is equivalent to the translational motion in the X-axis direction caused by rolling of the imaginary wheel 61_x.

Further, the radius r_x of the imaginary wheel 61_x and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around −Y-axis from the floor surface. In the present embodiment, this r_x is equivalent to the distance between the axis of the annular core bodies 6 of the first moving motion unit 3 and the grounding surface.

In a similar manner, the inverted pendulum model expressing the behavior of the vehicle system entirety gravity center as viewed from the X-axis direction includes an imaginary wheel 61_y having the rotation axis parallel to the X-axis direction and rollable on the floor surface (hereinafter referred to as the imaginary wheel 61_y), a rod 62_y extended from the rotation center of the imaginary wheel 61_y and swingable around the rotation axis of the imaginary wheel 61_y (in the direction around X-axis), and a mass point Ga_y connected to a reference Ps_y that is the distal end (upper end) of the rod 62_y.

In the inverted pendulum model, the motion of the mass point Ga_y is equivalent to the motion of the vehicle system entirety gravity center as viewed from the X-axis direction, and the inclination angle θb_y (the inclination angle in the direction around X-axis) of the rod 62_y with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_y.

Further, the radius r_y of the imaginary wheel 61_y and the height by of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height by of the reference Ps_y and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

Here, a comment will be added on the positional relation between the reference Ps_x and the mass point Ga_x as viewed from the Y-axis direction. The position of the reference Ps_x is equivalent to the position of the vehicle system entirety gravity center in a case where the occupant riding (sitting on) the occupant riding section 5 is assumed to be immobile with respect to the occupant riding section 5. Therefore, in this case, the position of the mass point Ga_x agrees to the position of the reference Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system entirety gravity center come to be shifted to the lateral direction respectively from the positions of the reference Ps_x, Ps_y in general. Therefore, in FIG. 5, the positions of the mass points Ga_x, Ga_y are illustrated in a state shifted respectively from the positions of the reference Ps_x, Ps_y.

The behavior of the vehicle system entirety gravity center expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h\_y \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

Here, Vb_x is the speed (translational speed) in the X-axis direction of the vehicle system entirety gravity center, Vw1_x is the moving speed (translational speed) in the X-axis direction of the imaginary wheel 61_x, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system entirety gravity center (the position in the X-axis direction of the mass point Ga_x) from the position of the reference Ps_x, Vb_y is the speed (translational speed) in the Y-axis direction of the vehicle system entirety gravity center, Vw1_y is the moving speed (translational speed) in the Y-axis direction of the imaginary wheel 61_y, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system entirety gravity center (the position in the Y-axis direction of the mass point Ga_y) from the position of the reference Ps_y. Also, ωz is the yaw rate (the angular velocity in the direction around the yaw axis) when the vehicle 1 turns, and g is the gravitational acceleration constant. Further, the positive direction of θb_x, ωb_x is the direction that the vehicle system entirety gravity center inclines to the positive direction of X-axis (forward), and the positive direction of θb_y, ωb_y is the direction that the vehicle system entirety gravity center inclines to the positive direction of Y-axis (leftward). Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·ωb_y) is the translational speed component in the Y-axis direction of the reference Ps_y generated by tilting of the occupant riding section 5 in the direction around –X-axis.

In addition, more specifically, Vw1_x in the expression (1a) is the relative circumferential speed of the imaginary wheel 61_x with respect to the rod 62_x (in other words, with respect to the occupant riding section 5 or the base 2). Therefore, in Vw1_x, in addition to the moving speed in the X-axis direction of the grounding point of the imaginary wheel 61_x to the floor surface (the moving speed in the X-axis direction of the grounding point of the first moving motion unit 3 to the floor surface), a velocity component accompanying tilting of the rod 62_x(=r_x·ωb_x) is included. This fact is similar to Vw1_y in the expression (2a) also.

Also, the first term of the right side of the expression (1b) is the acceleration component in the X-axis direction generated in the vehicle system entirety gravity center by the component in the X-axis direction (F_x in FIG. 5) of the floor reaction force (F in FIG. 5) applied to the grounding part of the imaginary wheel 61_x according to the shift amount (=θb_x·(h−r_x)+Ofst_x) of the position in the X-axis direction of the vehicle system entirety gravity center (the position in the X-axis direction of the mass point Ga_x) from the upper position in the vertical direction of the grounding part of the imaginary wheel 61_x (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system entirety gravity center by the component in the Y-axis direction (F_y in FIG. 5) of the floor reaction force (F in FIG. 5) applied to the grounding part of the imaginary wheel 61_y according to the shift amount (=θb_y·(h−r_y)+Ofst_y) of the position in the Y-axis direction of the vehicle system entirety gravity center (the position in the Y-axis direction of the mass point Ga_y) from the upper position in the vertical direction of the grounding part of the imaginary wheel 61_y (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

Figure 6:
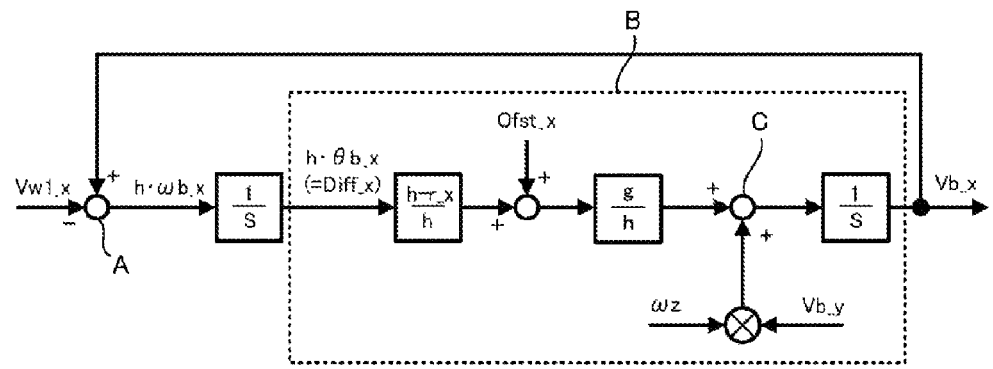
FIG. 6 is a block diagram showing a behavior in relation with the inverted pendulum model of FIG. 5.

As described above, the behavior expressed by the expressions (1a), (1b) (the behavior as viewed in the X-axis direction) is expressed as shown in FIG. 6 when expressed by a block diagram. 1/s in the drawing expresses integral calculation.

Also, processing of the calculation unit marked with the reference sign A in FIG. 6 corresponds to the relation formula of the expression (1a), and processing of the calculation unit marked with the reference sign B corresponds to the relation formula of the expression (1b).

Further, h·θb_x in FIG. 6 approximately agrees to Diff_x shown in FIG. 5.

On the other hand, the block diagram that expresses the behavior expressed by the expressions (2a), (2b) (the behavior as viewed in the Y-axis direction) is obtained by substituting "_y" for the suffixes "_x" in FIG. 6 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system entirety gravity center (inverted pendulum model) that takes the shift amount of the vehicle system entirety gravity center from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

Reference is made to FIG. 4. At each calculation processing period of the control device 21, the first control processing unit 24 executes processing of the operation command conversion unit 31 and processing of the gravity center speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The gravity center speed estimation unit 33 calculates an estimate value Vb_estm1_xy of the speed of the vehicle system entirety gravity center based on a geometric (kinematic) relation formula expressed by the expressions (1a), (2a) in the inverted pendulum model.

More specifically, as shown in the block diagram of FIG. 4, the estimate value Vb_estm1_xy of the speed of the vehicle system entirety gravity center is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system entirety gravity center.

That is, the estimate value Vb_estm1_x of the speed in the X-axis direction and the estimate value Vb_estm1_y of the speed in the Y-axis direction of the vehicle system entirety gravity center are calculated respectively by expressions (3a), (3b) below.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the shift amount Ofst_xy of the position of the vehicle system entirety gravity center from the position of the reference Ps_xy (hereinafter referred to as a gravity center shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1 act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, newest values of the temporal change rate of the measured value of the inclination angle θb of the occupant riding section 5 based on the detection signal of the inclination sensor 22 (in other words, newest values of the measured values of ωb_act_x, ωb_act_y) are used.

The first control processing unit 24 determines a gravity center shift amount estimate value Ofst_estm_xy that is the estimate value of the gravity center shift amount Ofst_xy by executing processing of the operation command conversion unit 31 and the gravity center speed estimation unit 33 as described above and thereafter executing processing of a gravity center shift estimation unit 35a shown in FIG. 4.

Figure 7:
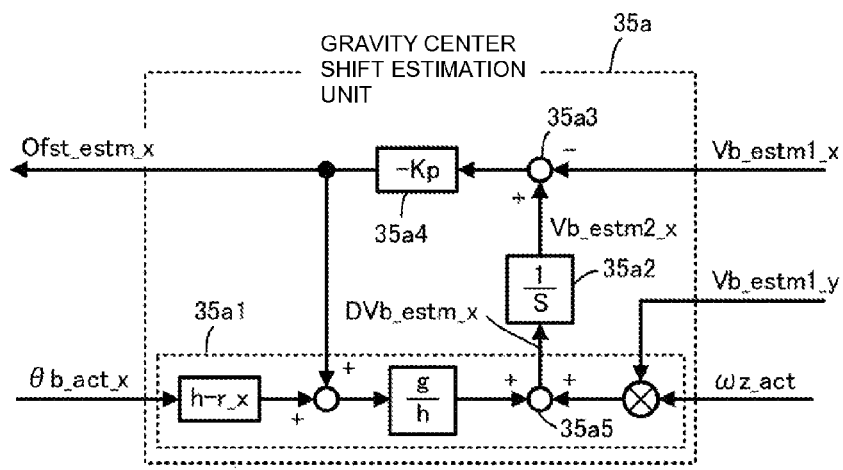
FIG. 7 is a block diagram showing processing of a gravity center shift estimation unit shown in FIG. 4.

Processing of this gravity center shift estimation unit 35a is processing shown by the block diagram of FIG. 7. Also, FIG. 7 typically shows the determining process of the gravity center shift amount estimate value Ofst_estm_x in the X-axis direction out of the gravity center shift amount estimate value Ofst_estm_xy. The estimate value of the right/left direction entirety gravity center shift amount can be calculated one by one by calculation shown in the block diagram of FIG. 7, for example. In the description below, the first estimate values Vb_estm1_x and Vb_estm1_y means the estimate values Vb_x and Vb_estm1_y of the speed of the vehicle system entirety gravity center calculated by the gravity center speed estimation unit 33, respectively.

More specifically, by multiplying deviations of the moving speed in the right/left direction of the gravity center of the entirety of the vehicle and the occupant (may be hereinafter referred to as the vehicle system entirety gravity center) from the first estimate value Vb_estm1_y and the second estimate value Vb_estm2_y by a gain of a predetermined value determined beforehand, the estimate value of the right/left direction entirety gravity center shift amount can be determined one by one so as to converge to the actual value.

Here, the first estimate value Vb_estm1_y is an estimate value of the moving speed in the right/left direction of the vehicle system entirety gravity center kinematically calculated by an expression (A) below, and the second estimate value Vb_estm2_y is an estimate value of the moving speed calculated by integrating the movement acceleration Dvb_estm2_y in the right/left direction of the vehicle system entirety gravity center dynamically calculated by expression (B) below.

$$Vb\_estm1\_y = Vw1\_act\_y + h \cdot \omega b\_act\_y \quad (A)$$

$$Dvb\_estm\_y = (\theta b\_act\_y \cdot (h - r\_y) + Ofst\_estm\_y(k-1)) \cdot (g/h) - Vb\_estm1\_x \cdot \omega z\_act \quad (B)$$

In the expressions above;
Vw1_act_y: the observed value of the moving speed in the right/left direction of the first moving motion unit
h: the value determined beforehand as the height of the vehicle system entirety gravity center from the floor surface
ωb_act_y: the observed value of the angular velocity of tilting of the occupant riding section in the direction around the axis in the front/rear direction
θb_act_y: the observed value of the inclination angle in the direction around the axis in the front/rear direction (the inclination angle with respect to the vertical direction, (e.g: an imaginary line that extends orthogonally with respect to the floor surface)) of the occupant riding section r: the height of the center of tilting of the occupant riding section in the direction around the axis in the front/rear direction from the floor surface
Ofst_estm_y(k−1): the newest value out of the estimated values of the right/left direction entirety gravity center shift amount having been calculated already
g: gravity acceleration constant
Vb_estm1_x: the estimate value of the moving speed in the right/left direction of the vehicle system entirety gravity center calculated by expression (C) below $$Vb\_estm1\_x = Vw1\_act\_x + h \cdot \omega b\_act\_x \quad (C)$$

Vw1_act_x: the observed value of the moving speed in the front/rear direction of the first moving motion unit ωb_act_x: the observed value of the angular velocity of tilting of the occupant riding section in the direction around the axis in the right/left direction ωz_act: the angular velocity of the vehicle in the direction around the yaw axis The "observed value" in relation with an optional quantity of state such as the moving speed and the like means a detection value of the quantity of state detected by an appropriate sensor, or an estimate value estimated based on the correlation from a detection value of other one or more quantity of state having a constant correlation with the quantity of state.

Processing of FIG. 7 will be described specifically. The gravity center shift estimation unit 35a calculates the estimate value DVb_estm_x of the translational acceleration in the X-axis direction of the vehicle system entirety gravity center by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system entirety gravity center in the Y-axis direction calculated by the gravity center speed estimation unit 33, and the gravity center shift amount estimate value Ofst_estm_x (the value of the last time) in the X-axis direction determined at the calculation processing period of the last time.

Also the gravity center shift estimation unit 35a calculates the second estimate value Vb_estm2_x of the speed of the vehicle system entirety gravity center in the X axis direction by executing processing of integrating the estimate value DVb_estm_x of the translational acceleration in the X-axis direction of the vehicle system entirety gravity center by a calculation unit 35a2.

Next, the gravity center shift estimation unit 35a executes processing of calculating the deviation of the second estimate value Vb_estm2_x (newest value) of the speed of the vehicle system entirety gravity center in the X-axis direction and the first estimate value Vb_estm1_x (the newest value) by a calculation unit 35a3.

Further, the gravity center shift estimation unit 35a determines the newest value of the gravity center shift amount estimate value Ofst_estm_x in the X-axis direction by executing processing of multiplying this deviation by a predetermined gain (−Kp) by a calculation unit 35a4.

Determining processing of the gravity center shift amount estimate value Ofst_estm_y in the Y-axis direction is also executed similarly to the above. More specifically, the block diagram that shows this determining processing is obtained by replacing the suffixes "_x" and "_y" in FIG. 7 with each other and substituting "−" for the marks "+" of the acceleration component (the acceleration component generated by the centrifugal force) on the right side in the drawing that is one of the inputs to an adder 35a5.

By such processing of the gravity center shift estimation unit 35a, Ofst_estm_xy can be determined so as to converge to an actual value by determining the gravity center shift amount estimate value Ofst_estm_xy while updating it one by one.

Next, the first control processing unit 24 calculates the gravity center shift effect amount Vofs_xy by executing processing of a gravity center shift effect amount calculation unit 35b shown in FIG. 4.

The gravity center shift effect amount Vofs_xy expresses the shift of the actual gravity center speed with respect to the target speed of the vehicle system entirety gravity center when feedback-control is executed in the attitude control calculation unit 34 described below without taking that the position of the vehicle system entirety gravity center shifts from the position of the reference Ps_xy in the inverted pendulum model into consideration.

More specifically, this gravity center shift effect amount calculation unit 35b calculates the gravity center shift effect amount Vofs_xy by multiplying each component of the newly determined gravity center shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system entirety gravity center and Vb_estm1_xy in the first estimate value of the speed of the vehicle system entirety gravity center close to zero in processing of the attitude control calculation unit 34 described below.

Next, the first control processing unit 24 calculates a post-restriction gravity center target speed Vb_cmd_xy based on the basic speed command Vjs_xy determined by the operation command conversion unit 31 and the gravity center shift effect amount Vofs_xy determined by the gravity center shift effect amount calculation unit 35b by executing processing of the gravity center target speed determination unit 32 shown in FIG. 4.

First, the gravity center target speed determination unit 32 executes processing of a processing unit 32c shown in FIG. 4. This processing unit 32c determines a target gravity center speed adding amount Vb_cmd_by_ofs_xy as a component according to the shift of the gravity center out of the target value of the speed of the vehicle system entirety gravity center by executing dead zone processing and limiting processing in relation with the value of the gravity center shift effect amount Vofs_xy.

More specifically, in the present embodiment, when the magnitude of the gravity center shift effect amount Vofs_xy in the X-axis direction is a value within the dead zone that is a predetermined range in the vicinity of zero (a value comparatively near to zero), the gravity center target speed determination unit 32 makes the target gravity center speed adding amount Vb_cmd_by_ofs_xy in the X-axis direction zero.

Also, when the magnitude of the gravity center shift effect amount Vofs_x in the X-axis direction is a value deviated from the dead zone, the gravity center target speed determination unit 32 determines the target gravity center speed adding amount Vb_cmd_by_ofs_x in the X-axis direction to be of a polarity same as that of Vofs_x and so that the magnitude thereof increases as the magnitude of Vofs_x increases. However, the value of the target gravity center speed adding amount Vb_cmd_by_ofs_x is restricted to the range between predetermined upper limit value (>0) and lower limit value (≤0).

The determining process of the target gravity center speed adding amount Vb_cmd_by_ofs_y in the Y-axis direction is also similar to the above.

Next, the gravity center target speed determination unit 32 executes processing for determining the target speed V1_xy that is obtained by adding each component of the target gravity center speed adding amount Vb_cmd_by_ofs_xy to each component of the basic speed command Vjs_xy which is determined by the operation command conversion unit 31 by a processing unit 32*d* shown in FIG. 4. That is, V1_xy (a set of V1_x and V1_y) is determined by processing of V1_x=Vjs_x+Vb_cmd_by_ofs_x, V1_y=Vjs_y+Vb_cmd_by_ofs_y.

Further, the gravity center target speed determination unit 32 executes processing of a processing unit 32*e*. This processing unit 32*e* executes limiting processing for determining the post-restriction gravity center target speed Vb_cmd_xy (a set of Vb_cmd_x and Vb_cmd_y) as the target speed of the vehicle system entirety gravity center obtained by restricting combination of the target speed V1_x and V1_y in order that each rotational speed of the electric motor 8*a*, 8*b* as the actuator device 8 of the first moving motion unit 3 does not deviate from a predetermined allowable range.

In this case, when a set of the target speeds V1_x and V1_y obtained by the processing unit 32*d* exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction gravity center target speed Vb_cmd_xy as it is.

Also when a set of the target speeds V1_x and V1_y obtained by the processing unit 32*d* deviates from the predetermined region on the coordination system, one restricted to a set on the boundary of the predetermined region is determined as the post-restriction gravity center target speed Vb_cmd_xy.

As described above, because the gravity center target speed Vb_cmd_xy is determined based on the basic speed command Vjs_xy and the gravity center shift effect amount Vofs_xy (or the gravity center shift amount), the occupant can steer the vehicle 1 by operation of the controller (operation of the joy stick 12) and by change of the attitude of the body of the occupant (movement of the body weight).

After executing processing of the gravity center target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 4.

More specifically, first, the attitude control calculation unit 34 determines the target speed after gravity center shift compensation Vb_cmpn_cmd_xy (newest value) by executing processing of reducing each component of the gravity center shift effect amount Vofs_xy_by a calculation unit 34*b* from each component of the post-restriction gravity center target speed Vb_cmd_xy.

Next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34*b* and the calculation units excluding an integration calculation unit 34*a* that executes integration calculation by calculation of expressions (4a), (4b) below, respectively.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, Kw_xy in the expressions (4a), (4b) are predetermined gain values that are set beforehand.

Also, the first term of the right side of the expression (4a) is a feedback manipulated variable component according to the deviation of the target speed after gravity center shift compensation Vb_cmpn_cmd_x (newest value) in the X-axis direction of the vehicle system entirety gravity center and the first estimate value Vb_estm1_x (newest value), the second term is a feedback manipulated variable component according to the measured value (newest value) of the actual inclination angle θb_act_x in the direction around Y-axis of the occupant riding section 5, and the third term is a feedback manipulated variable component according to the measured value (newest value) of the actual inclination angular velocity ωb_act_x in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after gravity center shift compensation Vb_cmpn_cmd_y (newest value) in the Y-axis direction of the vehicle system entirety gravity center and the first estimate value Vb_estm1_y (newest value), the second term is a feedback manipulated variable component according to the measured value (newest value) of the actual inclination angle θb_act_y in the direction around X-axis of the occupant riding section 5, and the third term is a feedback manipulated variable component according to the measured value (newest value) of the actual inclination angular velocity ωb_act_y in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34*a*.

Also, the first control processing unit 24 controls the electric motors 8*a*, 8*b* as the actuator device 8 of the first moving motion unit 3 according to the first target speed Vw1_cmd_xy determined as described above. More specifically, the first control processing unit 24 determines the current command value of the each electric motor 8*a*, 8*b* by feedback control processing so that actual rotational speed (measured value) follows up the target value of the rotational speed of the each electric motor 8*a*, 8*b* decided by the first target speed Vw1_cmd_xy, and executes energization of the each electric motor 8*a*, 8*b* according to this current command value.

By processing described above, in a state where the post-restriction gravity center target speed Vb_cmd_xy is a constant value, motion of the vehicle 1 is settled, and the vehicle 1 is moving straight at a constant speed, the vehicle system entirety gravity center exists just above the grounding point of the first moving motion unit 3. In this state, the actual inclination angle θb_act_xy of the occupant riding section 5 becomes −Ofst_xy/(h−r_xy) based on the expressions (1b), (2b). Also, the actual inclination angular velocity ωb_act_xy of the occupant riding section 5 becomes zero, and the target translational acceleration DVw1_cmd_xy becomes zero. From this fact and the block diagram of FIG. 4, agreement of Vb_estm1_xy and Vb_cmd_xy is derived.

That is, the first target speed Vw1_cmd_xy of the first moving motion unit 3 is basically determined so that the deviation of the post-restriction gravity center target speed Vb_cmd_xy and the first estimate value Vb_estm1_xy of the vehicle system entirety gravity center converges to zero.

Also, each rotational speed of the electric motor 8a, 8b as the actuator device 8 of the first moving motion unit 3 is controlled so as not to deviate from a predetermined allowable range by processing of the processing unit 32e while compensating the effect of the event that the position of the vehicle system entirety gravity center shifts from the position of the reference Ps_xy in the inverted pendulum model.

In addition, because Vb_cmpn_cmd_x=Vb_cmd_x−Vofs_x=Vb_cmd_x−(Kth_x/h−r_x)·(1/Kvb_x)·Ofst_estm_x and Vb_cmpn_cmd_y=Vb_cmd_y−Vofs_y=Vb_cmd_y−(Kth_y/h−r_y)·(1/Kvb_y)·Ofst_estm_y in the expressions (4a), (4b), the expressions (4a), (4b) can be rewritten to expressions (4a)′, (4b)′ below, respectively.

DVw1_cmd_x=Kvb_x·(Vb_cmd_x−Vb_estm1_x)−Kth_x·(Ofst_estm_x/(h−r_x)+θb_act_x)−Kw_x·ωb_act_x    (4a)′

DVw1_cmd_y=Kvb_y·(Vb_cmd_y−Vb_estm1_y)−Kth_y·(Ofst_estm_y/(h−r_y)+θb_act_y)−Kw_y·ωb_act_y    (4b)′

In this case, the second term of the right side of the expressions (4a)′, (4b)′ has the meaning as the feedback manipulated variable component for bringing the actual position of the vehicle system entirety gravity center in the X-axis direction and the Y-axis direction to the position just above the grounding part of the first moving motion unit 3.

Above is the detail of processing of the first control processing unit 24 in the present embodiment.

Next, processing of the second control processing unit 25 will be described referring to FIG. 8. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system entirety gravity center or the first moving motion unit 3 or the motion state of the target, or the action state of the occupant in relation with the motion states.

In the present embodiment, as an indicator for determining presence/absence of the turning request or the degree of the turning request, the estimate value Vb_estm1_y of the moving speed in the Y-axis direction of the vehicle system entirety gravity center calculated by the gravity center speed estimation unit 33 is used. Also, because Vb_estm1_y agrees to the moving speed in the Y-axis direction of the reference Ps_y, it has the meaning as the observed value of the moving speed in the Y-axis direction of the representative point fixed with respect to the occupant riding section 5 (or the base 2).

Further, when it is determined that there is a turning request, in order to make the vehicle 1 turn, the second control processing unit 25 determines the second target speed Vw2_cmd_y in the Y-axis direction of the second moving motion unit 4 so as to be different from the first target speed Vw1_cmd_y in the Y-axis direction of the first moving motion unit 3.

Such processing of the second control processing unit 25 is executed specifically as described below. That is, with reference to FIG. 8, first, the second control processing unit 25 executes processing of a processing unit 41. To the processing unit 41, the estimate value Vb_estm1_y (newest value) of the moving speed in the Y-axis direction of the vehicle system entirety gravity center calculated by the gravity center speed estimation unit 33 is inputted. Also, the processing unit 41 determines the speed after dead zone processing Vw1a_y according to Vb_estm1_y.

Here, when the occupant of the vehicle 1 intends to turn the vehicle 1 to the right or left, the occupant normally tries to shift the gravity center of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the gravity center of the occupant himself or herself may possibly shifts to the right or left to some extent by drift of the upper body of the occupant.

Figure 8:
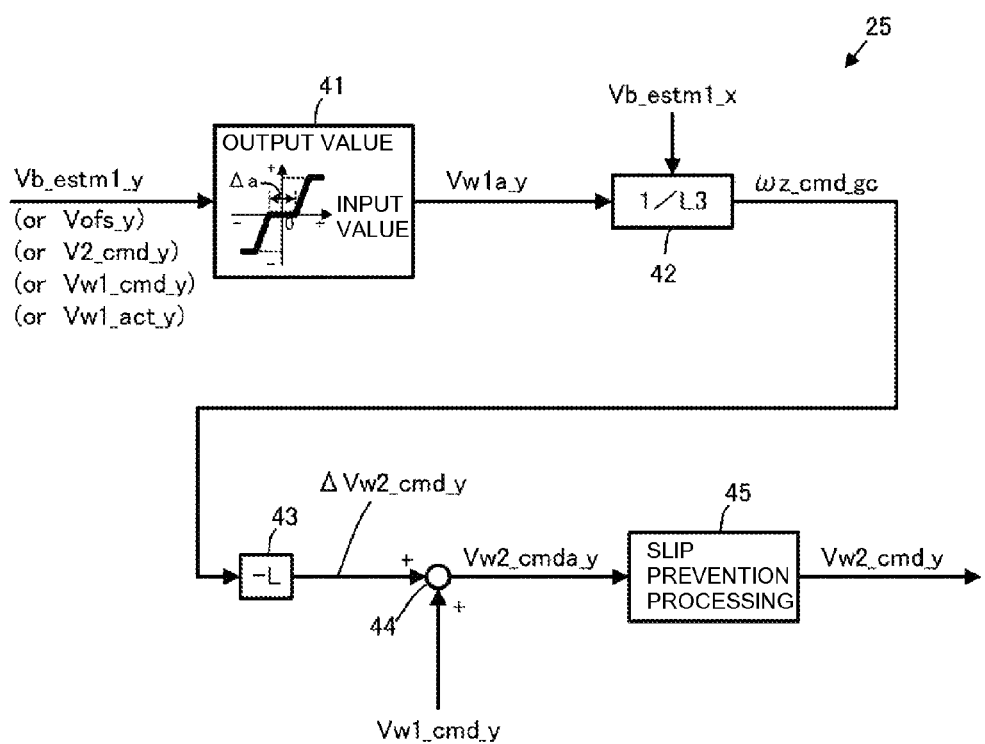
FIG. 8 is a block diagram showing processing of the second control processing unit shown in FIG. 3.

Therefore, by the characteristic of the graph shown in FIG. 8, the processing unit 41 determines the speed after dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying increase of the absolute value of Vb_estm1_y in the range of a predetermined upper limit value or less. In this case, the polarity (direction) of Vw1a_y is made same as that of Vb_estm1_y. As described below, in order to set the center of turning to a preferable position, the increase ratio of the absolute value of Vw1a_y with respect to increase of the absolute value of Vb_estm1_y is preferable to be 1. That is, in a region excluding the dead zone and the saturate region in the graph of FIG. 8, the inclination is preferable to be 1.

Also, in FIG. 8, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value $Vb\_estm1\_x$ (newest value) of the actual moving speed in the X-axis direction of the vehicle system entirety gravity center as the representative point of the vehicle 1.

Also, more specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when $Vb\_estm1\_x$ is zero, the distance L3 in the X-axis direction between the center of turning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

Also, when $Vb\_estm1\_x$ is positive which is the case of moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of $Vb\_estm1\_x$ increases. That is, L3 is set so as to reduce as the magnitude (absolute value) of $Vb\_estm1\_x$ increases. However, L3 is restricted to a distance of a predetermined lower limit value (>0) or more.

When $Vb\_estm1\_x$ is negative which is the case of moving rearward, L3 is preferable to be set to be the same as a value of a case where $Vb\_estm1\_x$ is zero, or to increase as the magnitude (absolute value) of $Vb\_estm1\_x$ increases.

The processing unit 42 determines the target turning angular velocity $\omega z\_cmd\_gc$ by dividing $Vw1a\_y$ by the distance L3 that is determined thus according to $Vb\_estm1\_x$. Also, $\omega z\_cmd\_gc$ is the angular velocity of the left turn (counterclockwise) when $Vw1a\_y$ is the leftward velocity, and is the angular velocity of the right turn (clockwise) when $Vw1a\_y$ is the rightward velocity.

Next, the second control processing unit 25 executes processing of a processing unit 43. The processing unit 43 calculates the relative moving speed $\Delta Vw2\_cmd\_y$ in the Y-axis direction of the second moving motion unit 4 with respect to the first moving motion unit 3 in a case where the vehicle 1 turns at the target turning angular velocity $\omega z\_cmd\_gc$ by multiplying the target turning angular velocity $\omega z\_cmd\_gc$ determined by the processing unit 42 by a value (=−L) of (−1) times of a predetermined distance between the grounding part of the first moving motion unit 3 and the grounding part of the second moving motion unit 4.

In a case of to $\omega z\_cmd\_gc=0$ (in a case where there is no turning request), the relative moving speed $\Delta Vw2\_cmd\_y$ in the Y-axis direction of the second moving motion unit 4 thus determined becomes zero. Also, $\Delta Vw2\_cmd\_y$ is the rightward velocity when $\omega z\_cmd\_gc$ is the turning angular velocity of the left turn, and is the leftward velocity when $\omega z\_cmd\_gc$ is the turning angular velocity of the right turn.

Therefore, $\Delta Vw2\_cmd\_y$ of a case where there is a turning request is the velocity of the direction opposite to that of $Vw1a\_y$ or $Vb\_estm1\_y$.

Next, the second control processing unit 25 executes processing of a processing unit 44. This processing unit 44 determines the basic value $Vw2\_cmda\_y$ (newest value) of the second target speed $Vw2\_cmd\_y$ in the Y-axis direction of the second moving motion unit 4 by adding the relative moving speed $\Delta Vw2\_cmd\_y$ in the Y-axis direction of the second moving motion unit 4 to the first target speed $Vw1\_cmd\_y$ (newest value) in the Y-axis direction of the first moving motion unit 3 determined by the first control processing unit 24.

Next, the second control processing unit 25 executes processing of a processing unit 45. This processing unit 45 determines the second target speed $Vw2\_cmd\_y$ in the Y-axis direction of the second moving motion unit 4 by executing slip preventing processing for preventing slip of the second moving motion unit 4.

In this case, when slip of the second moving motion unit 4 is anticipated to be liable to occur, for example, in the case where the absolute value of the basic value $Vw2\_cmda\_y$ is excessively large, the processing unit 45 sets the second target speed $Vw2\_cmd\_y$ in the Y-axis direction of the second moving motion unit 4 to a speed that is corrected from the basic value $Vw2\_cmda\_y$. Also, when slip of the second moving motion unit 4 is not anticipated to occur, the processing unit 45 determines the basic value $Vw2\_cmda\_y$ as it is as the second target speed $Vw2\_cmd\_y$ in the Y-axis direction of the second moving motion unit 4.

Further, when the friction force between the second moving motion unit 4 and the floor surface can be secured sufficiently, for example, in the case where the second moving motion unit 4 is pressed to the floor surface by a spring and the like, processing of the processing unit 45 may be omitted.

Also, the second control processing unit 25 controls the electric motor 17 as the actuator device of the second moving motion unit 4 according to the second target speed $Vw2\_cmd\_y$ determined as described above. More specifically, the second control processing unit 25 determines the current command value of the electric motor 17 by feedback control processing so that the actual rotational speed (measured value) follows up the target value of the rotational speed of the electric motor 17 decided by the second target speed $Vw2\_cmd\_y$, and executes energization of the electric motor 17 according to this current command value.

Control processing of the second control processing unit 25 is executed as described above. Thus, the second target speed $Vw2\_cmd\_y$ in the Y-axis direction of the second moving motion unit 4 is determined basically to a speed obtained by adding the relative moving speed $\Delta Vw2\_cmd\_y$ to the first target speed $Vw1\_cmd\_y$ (newest value) in the Y-axis direction of the first moving motion unit 3.

In this case, under the situation that the absolute value of the estimate value $Vb\_estm1\_y$ of the moving speed in the Y-axis direction of the vehicle system entirety gravity center is small enough and it is determined that there is no turning request, $\Delta Vw2\_cmd\_y=0$ is resulted, and therefore the second target speed $Vw2\_cmd\_y$ in the Y-axis direction of the second moving motion unit 4 is basically determined so as to agree to the first target speed $Vw1\_cmd\_y$ in the Y-axis direction of the first moving motion unit 3.

On the other hand, under the situation that the absolute value of the estimate value $Vb\_estm1\_y$ of the moving speed in the Y-axis direction of the vehicle system entirety gravity center is comparatively large and it is determined that there is a turning request, $\Delta Vw2\_cmd\_y$ is determined to a velocity with the direction opposite to that of $Vb\_estm1\_y$. Therefore, the second target speed $Vw2\_cmd\_y$ in the Y-axis direction of the second moving motion unit 4 is basically determined to a velocity with the direction same as that of the first target speed $Vw1\_cmd\_y$ in the Y-axis direction of the first moving motion unit 3 and with a magnitude smaller than that of $Vw1\_cmd\_y$ (a velocity of zero or near to zero), or is determined to a velocity with the direction opposite to that of the first target speed $Vw1\_cmd\_y$ in the Y-axis direction of the first moving motion unit 3.

(Selection Processing of Control Mode of Vehicle)

Selection processing of the control mode of the vehicle 1 executed by the control device 21 will be described using FIG. 10.

Figure 10:
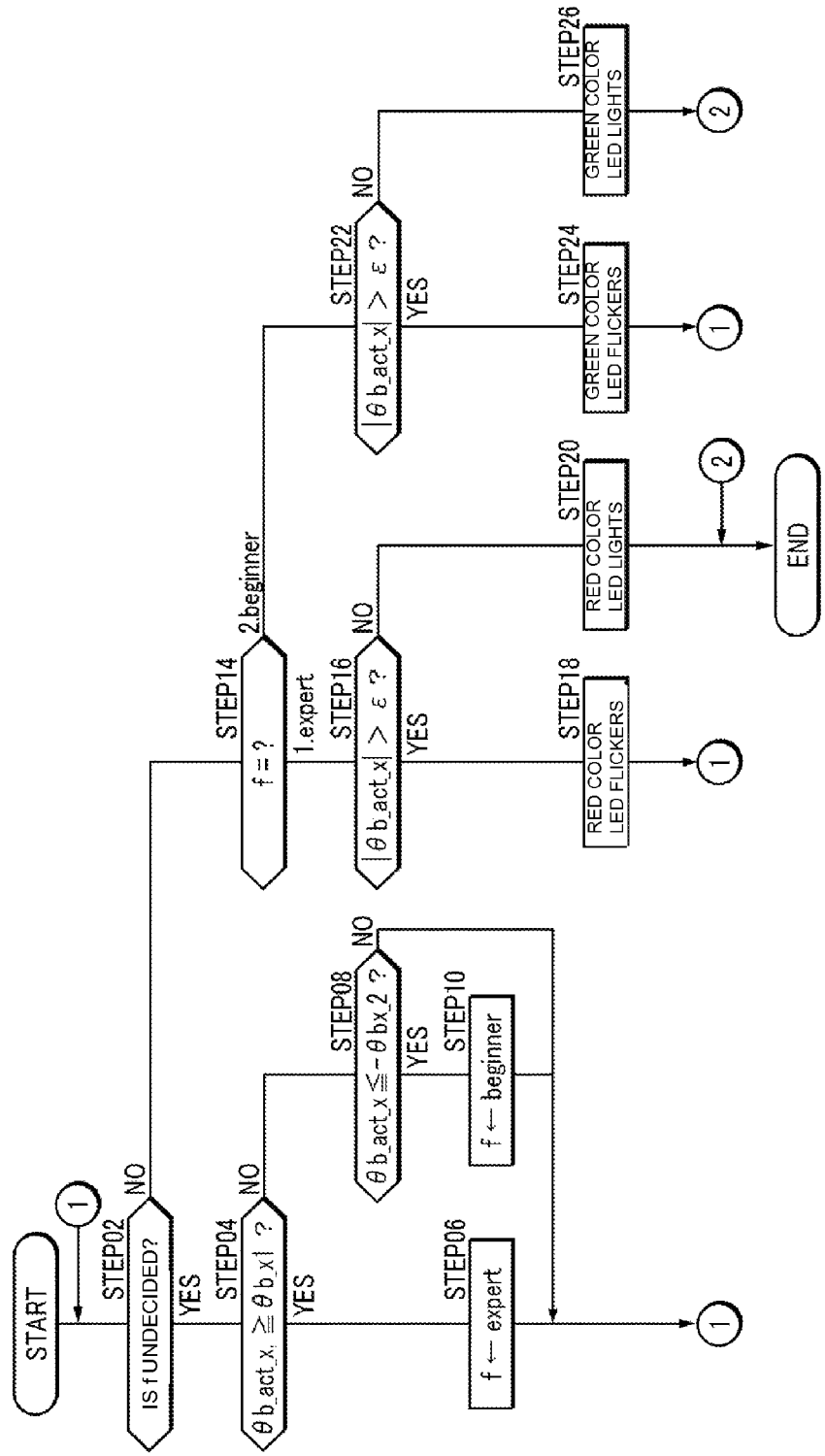
FIG. 10 is an explanatory drawing in relation with a control mode selection process.

First, with a trigger that the vehicle 1 is started such as switching of a power source switch from OFF to ON, whether the control mode flag f is undecided or not is determined (FIG. 10/STEP 02). At every start of the vehicle 1, the control mode flag f is undecided.

When the control mode flag f is determined to be undecided (FIG. 10/STEP 02 . . . YES), whether or not the actual inclination angle $\theta b\_act\_x$ to +X direction of the occupant riding section 5 is equal to or larger than the first designated angle $\theta b\_x1$ is determined (FIG. 10/STEP 04). The first designated angle $\theta b\_x1$ is set to an appropriate value such as 20° from the viewpoint of confirmation of intension for control mode selection by the user.

When the actual inclination angle $\theta b\_act\_x$ to +X direction of the occupant riding section 5 is determined to be equal to or larger than the first designated angle $\theta b\_x1$ (FIG. 10/STEP 04 . . . YES), the control mode flag f is set to "expert" (FIG. 10/STEP 06). Also, processing of the determination processing whether the control mode flag f is undecided or not (refer to FIG. 10/STEP 02) and onward is executed.

On the other hand, when the determination result is negative (FIG. 10/STEP 04 . . . NO), whether or not the magnitude of the actual inclination angle $\theta b\_act\_x$ to −X direction of the occupant riding section 5 is equal to or larger than the second designated angle $\theta b\_x2$ is determined (FIG. 10/STEP 08). The second designated angle $\theta b\_x2$ is also set to an appropriate value such as 20° and the like from the viewpoint similar to that of the first designated angle $\theta b\_x1$. The first designated angle $\theta b\_x1$ and the second designated angle $\theta b\_x2$ may be the same or different with each other.

When the magnitude of the actual inclination angle $\theta b\_act\_x$ to −X direction of the occupant riding section 5 is determined to be equal to or larger than the second designated angle $\theta b\_x2$ (FIG. 10/STEP 08 . . . YES), the control mode flag f is set to "beginner" (FIG. 10/STEP 10). Also, processing of the determination processing whether the control mode flag f is undecided or not (refer to FIG. 10/STEP 02) and onward is executed.

When the control mode flag f is determined to have been set (FIG. 10/STEP 02 . . . NO), whether the control mode flag f is "expert" or "beginner" is determined (FIG. 10/STEP 14).

When the control mode flag f is determined to be "expert" (FIG. 10/STEP 14 . . . 1), whether or not an absolute value $|\theta b\_act\_x|$ of the actual inclination angle $\theta b\_act\_x$ to the X direction of the occupant riding section 5 exceeds a reference value $\epsilon$ is determined (FIG. 10/STEP 16). The reference value $\epsilon$ is set to an appropriate value such as 5° from the viewpoint of confirming that the inclination state of the occupant riding section 5 has been restored to the initial state of $\theta b\_act\_x=0$ (or a state near to it).

When the absolute value $|\theta b\_act\_x|$ of the actual inclination angle $\theta b\_act\_x$ to the X direction of the occupant riding section 5 is determined to exceed the reference value $\epsilon$ (FIG. 10/STEP 16 . . . YES), a command signal for making the red color LED forming the indicator 200 flicker is outputted (FIG. 10/STEP 18). Thus, in the period after the occupant riding section 5 is tilted forward by the first designated angle $\theta b\_x1$ or more until the inclination state is restored to the initial state, the red color LED 202 becomes the flickering state. Also, processing of the determination processing whether the control mode flag f is undecided or not (refer to FIG. 10/STEP 02) and onward is executed.

On the other hand, when the absolute value $|\theta b\_act\_x|$ of the actual inclination angle $\theta b\_act\_x$ to the X direction of the occupant riding section 5 is determined to be the reference value $\epsilon$ or less (FIG. 10/STEP 16 . . . NO), a command signal for lighting the red color LED 202 forming the indicator 200 is outputted (FIG. 10/STEP 20), and selection processing of the control mode finishes.

Thus, when the tilting state is restored to the initial state after the occupant riding section 5 is tilted forward by the first designated angle $\theta b\_x1$ or more, the red color LED 202 becomes the lit state. Also, the motion of the electric motors 8a and 8b of the vehicle 1 is controlled according to "expert mode". That is, in addition to the event that the occupant riding section 5 is tilted to +X direction (forward direction) as the first designated direction by the first designated angle $\theta b\_x1$ or more, the event that the tilting state of the occupant riding section 5 is returned to the initial state thereafter is made a designated condition for selecting the expert mode.

When the control mode flag f is determined to be "beginner" (FIG. 10/STEP 14 . . . 2), whether or not the absolute value $|\theta b\_act\_x|$ of the actual inclination angle $\theta b\_act\_x$ to the X direction of the occupant riding section 5 exceeds the reference value $\epsilon$ is determined (FIG. 10/STEP 22).

When the absolute value $|\theta b\_act\_x|$ of the actual inclination angle $\theta b\_act\_x$ to the X direction of the occupant riding section 5 is determined to exceed the reference value (FIG. 10/STEP 22 . . . YES), a command signal for making the green color LED forming the indicator 200 flicker is outputted (FIG. 10/STEP 24). Thus, in the period after the occupant riding section 5 is tilted rearward by the second designated angle $\theta b\_x2$ or more until the inclination state is restored to the initial state, the green color LED 204 becomes the flickering state. Also, processing of the determination processing whether the control mode flag f is undecided or not (refer to FIG. 10/STEP 02) and onward is executed.

On the other hand, when the absolute value $|\theta b\_act\_x|$ of the actual inclination angle $\theta b\_act\_x$ to the X direction of the occupant riding section 5 is determined to be the reference value $\epsilon$ or less (FIG. 10/STEP BP 22 . . . NO), a command signal for lighting the green color LED 204 forming the indicator 200 is outputted (FIG. 10/STEP 26), and selection processing of the control mode finishes.

Thus, when the tilting state is restored to the initial state after the occupant riding section 5 is tilted rearward by the second designated angle $\theta b\_x2$ or more, the green color LED 204 becomes the lit state. Also, the motion of the electric motors 8a and 8b of the vehicle 1 is controlled according to "beginner mode". That is, in addition to the event that the occupant riding section 5 is tilted to the −X direction (rearward direction) as the second designated direction (a designated direction different from the first designated direction) by the second designated angle $\theta b\_x2$ or more, the event that the tilting state of the occupant riding section 5 is returned to the initial state thereafter is made a designated condition for selecting the beginner mode.

Only the event that the occupant riding section 5 is tilted to +X direction (forward direction) as the first designated direction by the first designated angle θb_x1 or more may be made a designated condition for selecting the expert mode (refer to FIG. 10/STEP 04 . . . YES). Similarly, only the event that the occupant riding section 5 is tilted to −X direction (rearward direction) as the second designated direction by the second designated angle θb_x2 or more may be made a designated condition for selecting the beginner mode (refer to FIG. 10/STEP 08 . . . YES).

The expert mode is such a control mode that the sensitivity with respect to the steering operation of the vehicle 1 by the user becomes higher than that in the beginner mode. More specifically, the adjustment factor of the steering sensitivity is differentiated according to the difference in the control mode.

As the adjustment factor of the steering sensitivity of the vehicle 1, the value of the gain coefficient used in the attitude control calculation unit 34 forming the first control processing unit 24 and the limiter characteristic of the processing unit 32c forming the gravity center target speed determination unit 32 (refer to FIG. 4 for the above) as well as the limiter characteristic of the processing unit 41 forming the second control processing unit 25 (refer to FIG. 8 for the above) can be cited.

The degree of differentiation of the adjustment factor among the control modes is properly set for every adjustment factor from the viewpoint of the steering feeling and the like of the vehicle 1 for the user. The magnitude of the degree of differentiation may be set according to the magnitude of the maximum absolute value of the tilting angle θb_x in the X direction of the occupant riding section 5. For example, the expert mode with higher steering sensitivity of the vehicle 1 may be selected as the control mode as the tilting angle θb_x to the forward direction of the occupant riding section 5 (the excess portion from the first designated angle θb_x1) is larger. Alternatively or additionally, the beginner mode with lower steering sensitivity of the vehicle 1 may be selected as the control mode as the tilting angle θb_x to the rearward direction of the occupant riding section 5 (the excess portion from the second designated angle θb_x2) is larger.

(Action Effect)

In the vehicle 1 of the present embodiment described above, translational movement of the vehicle 1 in the X-axis direction can be executed according to tilting in the front/rear direction (the X-axis direction) of the occupant riding section 5 (or the base 2) accompanying movement of the body of the occupant riding on the occupant riding section 5, or according to the advancing/retreating command outputted according to the swing operation in the front/rear direction of the joy stick 12.

Also, under such situation that movement in the right/left direction of the gravity center of the occupant himself or herself riding on the occupant riding section 5 (relative movement with respect to the occupant riding section 5) is comparatively small and the estimate value Vb_estm1_y of the moving speed in the Y-axis direction of the vehicle system entirety gravity center falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Further, combining these translational movements, translational movement of the vehicle 1 can be executed also in an optional direction oblique with respect to the X-axis direction and the Y-axis direction.

Also, when the estimate value Vb_estm1_y of the moving speed in the Y-axis direction of the vehicle system entirety gravity center deviates from the predetermined range Δa in the vicinity of zero because the occupant riding on the occupant riding section 5 moves the gravity center of the occupant himself or herself comparatively largely in the right/left direction, the second target speed Vw2_cmd_y in the Y-axis direction of the second moving motion unit 4 is determined to a speed shifted from the first target speed Vw1_cmd_y in the Y-axis direction of the second moving motion unit 4 by ΔVw2_cmd_y. Further, in this case, the second target speed Vw2_cmd_y is determined to such speed that makes the vehicle 1 turn around the center of turning on the rear side of the grounding part of the first moving motion unit 3.

Therefore, the occupant can turn the vehicle 1 only by moving the upper body so as to move the gravity center of the occupant himself or herself in the right/left direction. Also, in this case, the vehicle 1 turns in the left when the occupant moves the gravity center of the occupant himself or herself to the left, and the vehicle 1 turns in the right when the occupant moves the gravity center of the occupant himself or herself to the right. Accordingly, the movement of the gravity center of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

Also, for example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction), and therefore a large friction force can be prevented from applying to the first moving motion unit 3. Accordingly, turning (direction change) of the vehicle 1 can be executed smoothly.

Also, when the vehicle 1 is to be turned while the vehicle 1 is moved to the forward direction (the positive direction of X-axis), as the magnitude (absolute value) of the estimate value Vb_estm1_x of the moving speed in the X-axis direction of the vehicle system entirety gravity center as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

Also, in the present embodiment, the gravity center shift estimation unit 35a of the first control processing unit 24 estimates the gravity center shift amount Ofst_xy of the vehicle system entirety gravity center by processing shown in FIG. 7. Therefore, the gravity center shift amount can be estimated accurately. Also, as described above, according to the estimate value Ofst_estm_xy of this gravity center shift amount Ofst_xy, the target speed (post-restriction gravity center target speed) Vb_cmd_xy of the vehicle system entirety gravity center is determined. Therefore, the effect exerted to the behavior of the vehicle 1 by the gravity center shift amount Ofst_xy can be properly compensated.

Further, in the vehicle 1 of the present embodiment, the swing amount (the swing amount in the direction around Y-axis) of the second moving motion unit 4 with respect to the base 2 is mechanically restricted to within a predetermined range defined by the stoppers 16, 16, and therefore, in particular, the occupant riding section 5 can be prevented from tilting excessively to the rear side which is hard for the occupant to visually confirm.

Based on the detection result of the inclination state of the occupant riding section 5 by the inclination sensor 22 (refer to FIG. 3) that is a fundamental constituent of the vehicle 1, one control mode is selected out of plural control modes by the control device 21 (refer to FIG. 10). Therefore, the user can select the control mode by adjusting the inclination state of the occupant riding section 5 even while additional constitution such as a mode selection switch in the vehicle 1 is omitted.

More specifically, by making the user tilt the occupant riding section 5 to the first designated direction (forward direction) by the first designated angle θb_x1 or more, the expert mode can be selected as the control mode (refer to FIG. 10/STEP 04 . . . YES→STEP 06→STEP 20). By making the user tilt the occupant riding section 5 to the second designated direction (rearward direction) by the second designated angle θb_x2 or more, the beginner mode can be selected as the control mode (refer to FIG. 10/STEP 08 . . . YES→STEP 10→STEP 26).

Each of the forward direction with high instruction frequency as the translational direction of the vehicle 1 by the user and the rearward direction with the frequency lower than that of the forward direction is defined as the tilting direction (designated direction) of the occupant riding section 5 for control mode selection. Therefore, in view of the high-low difference in the frequency, the user can clearly recognize the difference in the selected control mode according to the difference in the tilting direction of the occupant riding section 5 and surely select the control mode intended by the user.

For example, when the user having excellent steering skill of the vehicle 1 has a tendency of gripping the holders 10 and moving the vehicle 1 forward similarly to the case of a motorcycle, the user can naturally select the expert mode in view of the tendency.

Even if the tilting state of the occupant riding section 5 is changed, when the detection result of the inclination state of the occupant riding section 5 achieved by the change does not satisfy a designated condition, the control mode is not selected (refer to FIG. 10/STEP 04 . . . NO→STEP 08 . . . NO). Therefore, such situation is avoided that the inclination state of the occupant riding section 5 changes to an unexpected form, for example, the occupant riding section 5 wiggles in the front/rear direction or tilts in the lateral direction, and the control mode not intended by the user is selected.

By making the user visually confirm the display condition of the indicator 200, which is, more specifically, the lighting state of the red color LED 202 and the green color LED 204, the user can easily confirm the control mode of the vehicle 1 in selection according to the display condition. Because the indicator 200 is disposed on the front side of the occupant riding section 5, the user in the state of riding on the occupant riding section 5 as an occupant can easily confirm the display content of the indicator 200. Employment of an indicator that is a fundamental constituent of the vehicle 1 as the indicator 200 is preferable from the viewpoint of reducing the manufacturing cost of the vehicle 1.

Second Embodiment and Third Embodiment

Next, the second embodiment and the third embodiment of the present invention will be described respectively referring to FIG. 9 (*a*), FIG. 9 (*b*). Also, the second embodiment and the third embodiment are different from the first embodiment with respect to only a part of processing of the second control processing unit 25. Therefore, in description of the second embodiment and the third embodiment, description of items same as those of the first embodiment will be omitted.

Also, in FIG. 9 (*a*), (*b*), the reference signs in parentheses relate to the modifications described below.

Figure 9:
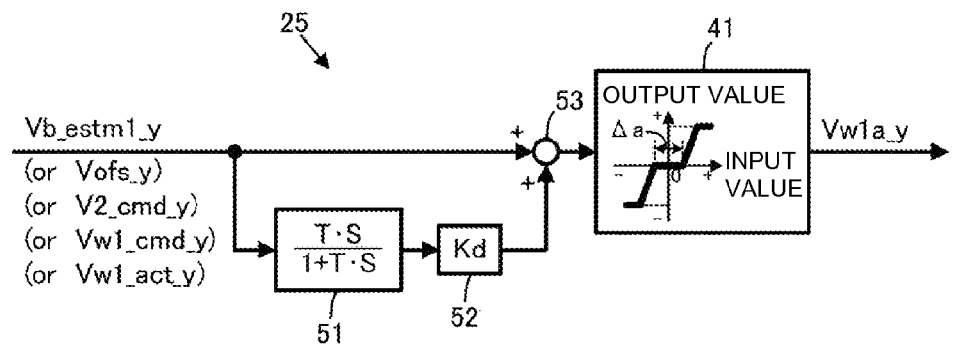
FIG. 9 (a) is a block diagram showing processing of an essential part of the second control processing unit in the second embodiment of the present invention.
Figure 9:
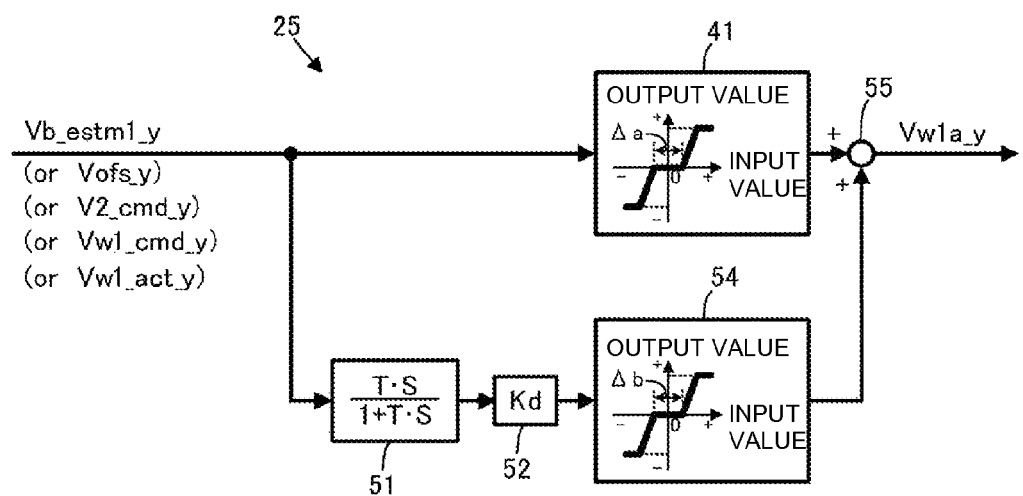

FIG. 9 (*a*) shows processing in which the second control processing unit 25 determines Vw1a_y (the target value of the speed after dead zone processing) according to the estimate value Vb_estm1_y of the moving speed in the Y-axis direction of the vehicle system entirety gravity center in the second embodiment.

In this second embodiment, the second control processing unit 25 includes a low-cut filter (pseudo-differentiation filter) 51 to which the estimate value Vb_estm1_y of the moving speed in the Y-axis direction of the vehicle system entirety gravity center is inputted. The second control processing unit 25 adds a value obtained by multiplying the output of the low-cut filter 51 (a value obtained by subjecting Vb_estm1_y to filtering processing of a low-cut characteristic) by the gain Kd of a predetermined value by a processing unit 52 to Vb_estm1_y by a calculation unit 53.

Also, the second control processing unit 25 inputs the output of the calculation unit 53 to the processing unit 41 same as that of the first embodiment instead of inputting Vb_estm1_y, executes processing of the processing unit 41 in a similar manner as done in the first embodiment, and thereby determines Vw1a_y. That is, Vw1a_y is equivalent to one obtained by passing Vb_estm1_y through a phase compensation circuit (filter).

The second embodiment is the same as the first embodiment with respect to the items other than those described above.

In such second embodiment, Vw1a_y and the target turning angular velocity ωz_cmd_gc are determined according to the phase compensation value of the estimate value Vb_estm1_y of the moving speed in the Y-axis direction of the vehicle system entirety gravity center (the output of the calculation unit 53) and the output of the low-cut filter 51 which becomes one according to the temporal change rate thereof.

Therefore, response of the turning behavior of the vehicle 1 can be improved with respect to movement in the Y-axis direction of the vehicle system entirety gravity center accompanying movement of the upper body of the occupant.

Next, FIG. 9 (*b*) shows processing in which the second control processing unit 25 determines Vw1a_y (the target value of the speed after dead zone processing) according to the estimate value Vb_estm1_y of the moving speed in the Y-axis direction of the vehicle system entirety gravity center in the third embodiment.

In the third embodiment, similarly to the first embodiment, the estimate value Vb_estm1_y of the moving speed in the Y-axis direction of the vehicle system entirety gravity center is configured to be inputted to the processing unit 41.

Also, in the third embodiment, in addition to including the low-cut filter 51 and the processing unit 52 which are the same as those of the second embodiment, the second control processing unit 25 further includes a processing unit 54 that inputs the output of the processing unit 52. This processing unit 54 executes processing similar to that of the processing unit 41.

More specifically, when the absolute value of the input value of the processing unit 54 is comparatively small and the input value is a value within a predetermined range Δb with zero taken in the center (when the absolute value of the input value is equal to or less than a predetermined value determined beforehand), the processing unit 54 makes the output value zero.

Also, when the absolute value of the input value of the processing unit 54 is comparatively large and the input value is a value out of the predetermined range b (when the absolute value of the input value is larger than the predetermined value determined beforehand), the processing unit 54 sets the output value to a value that is not zero.

More specifically, the processing unit 54 determines the output value according to the input value of the processing unit 54 so that the absolute value of the output value thereof increases accompanying increase of the absolute value of the input value of the processing unit 54 in the range of a predetermined upper limit value or less. In this case, the polarity (direction) of the output value of the processing unit 54 is made same as that of the input value.

Also, the second control processing unit 25 in the third embodiment determines Vw1a_y by adding the output value of the processing unit 41 and the output value of the processing unit 54 by a calculation unit 55.

The third embodiment is the same as the first embodiment with respect to the items other than those described above.

In the third embodiment, Vw1a_y is determined by adding a component determined by the processing unit 41 according to the estimate value Vb_estm1_y of the moving speed in the Y-axis direction of the vehicle system entirety gravity center and a component determined by the processing unit 54 according to the output of the low-cut filter 51 which becomes one according to the temporal change rate of Vb_estm1_y.

Therefore, similarly to the second embodiment, response of the turning behavior of the vehicle 1 can be improved with respect to movement in the Y-axis direction of the vehicle system entirety gravity center accompanying movement of the upper body of the occupant.

Next, some of modifications of the respective embodiments described above will be described.

In the embodiments, the "state detection unit" of the present invention was formed by the inclination sensor 22, however, as another embodiment, the "state detection unit" of the present invention may be formed by the yaw rate sensor 23 instead of or in addition to the inclination sensor 22. In the another embodiment, it may be configured that the control device 21 selects the control mode of the vehicle 1 based on the detection result of the angular velocity or the rotation angle around the yaw axis of the occupant riding section 5 (or the vehicle 1) expressed by the output signal of the yaw rate sensor 23 or the orientation in the world coordinate system.

For example, when the detection result expresses that the occupant riding section 5 turned clockwise in viewing the vehicle 1 from above, the expert mode is selected. On the other hand, when the detection result expresses that the occupant riding section 5 turned counterclockwise in viewing the vehicle 1 from above, the beginner mode is selected. The event that the rotation angle around the yaw axis is a designated angle or more may be defined as a designated condition for selecting the control mode.

In the embodiments, one control mode was selected out of two control modes (the expert mode and the beginner mode), however, as another embodiment, the control device 21 may be configured so that one control mode is selected out of three or more control modes. For example, the control device 21 may be configured so that one control mode is selected out of such three or more control modes that at least one out of the adjustment factors of the steering sensitivity of the vehicle 1 gradually increases or decreases.

In the vehicle 1, the second moving motion unit 4, the electric motor 17 as the second actuator device, and the second control processing unit 25 may be omitted. In this case, at least a part of the adjustment factors of the sensitivity with respect to the steering operation of the vehicle 1 can be differentiated according to the difference of the control mode. This is similar when the vehicle 1 translationally moves on the floor surface in a state where the second moving motion unit 4 departs from the floor surface and only the first moving motion unit 3 abuts on the floor surface.

In the embodiments, although presence of the history that the occupant riding section 5 tilted to the designated direction was defined as a designated condition for selecting the control mode, a designated condition different from the same may be defined alternatively or additionally. For example, an event that the temporal integrated value of the absolute value of the actual tilting angle θb_act_xy or the accumulated amount of the absolute maximum value of the actual tilting angle θb_act_xy of the occupant riding section 5 becomes a designated value or more may be defined as a designated condition for selecting the control mode.

The control mode may be switched so that the steering sensitivity of the vehicle 1 rises with a provision that, after the user rode on the occupant riding section 5, the occupant riding section 5 was tilted in various forms, the steering experience of the vehicle 1 was accumulated, and thereby the accumulation value reached a threshold value. In this case, the threshold value is appropriately set taking the skillfulness of the steering method of the vehicle 1 of the user into consideration.

In the embodiments, although the designated direction defiling the designated condition for selecting the control mode was set for each of the forward direction (+X direction) and the rearward direction (−X direction), a direction different from the forward direction and the rearward direction may be set as the designated direction. For example, each of the rightward direction (+Y direction) and the leftward direction (−Y direction) may be set as the designated direction. The expert mode can be selected as the control mode by making the user tilt the occupant riding section 5 to the rightward direction, whereas the beginner mode can be selected as the control mode by making the user tilt the occupant riding section 5 to the leftward direction.

In the embodiments, the state detection result of the occupant riding section 5 which becomes the selection basis of the control mode and the state detection result of the occupant riding section 5 which becomes the motion control basis of the actuator device (the electric motors 8a and 8b as well as the electric motor 17) are differentiated. As another embodiment, the state detection result of the occupant riding section 5 which becomes the selection basis of the control mode and the state detection result of the occupant riding section 5 which becomes the motion control basis of the actuator device may be common.

According to the another embodiment, the control mode is switched if the user tilts the occupant riding section 5 in a state riding on the occupant riding section 5, and a motion command value for the vehicle 1 such as the first target speed Vw1_cmd_xy, the second target speed Vw2_cmd_y and the like is outputted according to the control mode after the switching based on the tilting form of the occupant riding section 5 expressed by ωb_act_xy, θb_act_xy and the like. Thus, various steering sensitivity of the vehicle 1 can be imparted to the user. The vehicle 1 may be designed so that the change in the steering sensitivity of the vehicle 1 between before and after switching of the control mode after the user rides on the occupant riding section 5 becomes a threshold value or less.

The control mode may be selected based on the detection result of the inclination state of the occupant riding section 5 from start of the vehicle 1 until a designated period elapses. Thus, the user can start of the vehicle 1 (such as ON operation of the power source switch) and select the control mode by tilting of the occupant riding section 5 in succession in a state where, for example, the holders 10 are gripped by the hands, and therefore usability of the vehicle 1 can be improved.

Because the length of the designated period is adjusted, the user can select the control mode before riding on the occupant riding section 5 and thereafter steer the vehicle 1 according to the selected control mode. In other words, the detection result of the inclination state of the occupant riding section 5 which becomes the selection basis of the control mode and the detection result of the inclination state of the occupant riding section 5 which becomes the motion control basis of the first actuator device (the electric motors 8a and 8b) and the second actuator device (the electric motor 17) are differentiated.

Such a situation is avoided that an unintended control mode is selected by tilting of the occupant riding section 5 in a state where the user rides on the occupant riding section 5 as the occupant after a designated period. Not only is the control mode selected based on the common detection result of the state of the occupant riding section 5 but also such a situation can be avoided that the control form of the motion of the electric motors 8a and 8b changes according to the selected control mode and discontinuity occurs in the steering feeling of the vehicle 1 by the occupant.

In the embodiments, the selected control mode was displayed by each LED lit out of different monochrome LEDs, however, other than that, all configuration capable of making the user visually confirm the selected control mode may be employed. For example, the indicator 200 may be formed of a multicolor LED instead of or in addition to plural monochrome LEDs, and may be formed of an image display device such as a liquid crystal panel and the like or a flash gun or a projector directed to the floor surface (preferably the forward floor surface).

The indicator 200 may be arranged in a position different from the front side of the base 2 such as the right side of the base 2 or the holder 10 with a provision that the display content is visible by the user.

The control device 21 may be configured so as to lower the steering sensitivity of the vehicle 1 in the warming up period from start of the vehicle 1 until a constant time elapses compared to that in the normal operation period thereafter. In order to lower the steering sensitivity of the vehicle 1, for example, the dead zone of the processing unit 32c (refer to FIG. 4) of the gravity center target speed determination unit 32 forming the first control processing unit 24 is widened temporarily in the warming up period.

Thus, the situation that the vehicle 1 starts to move in the warming up period can be avoided.

The control device 21 may be configured so as to lower the steering sensitivity of the vehicle 1 intermittently or continuously when abnormality is detected in the vehicle 1. Thus, such situation is avoided that the damage increases because the vehicle 1 is still used continuously even if abnormality occurs in the vehicle 1. The control device 21 may be configured so as to display presence/absence of abnormality detection or the kind of abnormality on the indicator or to make a speaker output the same by sound.

As the abnormality, a system error such as noise-originated communication abnormality of the control device 21, significant drop of the storage quantity of the on-vehicle battery, overheat of a constituting component of the vehicle 1, excessive supply current to electric equipment that is a constituting component of the vehicle 1, and the like can be cited. In order to lower the steering sensitivity of the vehicle 1, for example, at least one of a limit value in the X-axis direction and the Y-axis direction of the processing unit 32e of the gravity center target speed determination unit 32 (refer to FIG. 4) forming the first control processing unit 24 and a limit value in the Y-axis direction of the processing unit 41 (refer to FIG. 8) forming the second control processing unit 25 is adjusted so as to gradually approach 0 after abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after occurrence of abnormality becomes possible or easy.

For example, when the event that the user gets down from the occupant riding section 5 is detected after drop of the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has restored to a normal value is confirmed after excessive supply current to the constituting component of the vehicle 1 is detected, the steering sensitivity of the vehicle 1 may be raised.

In the respective embodiments, in processing of the second control processing unit 25, as an indicator for determining presence/absence of the turning request or the degree of the turning request, the estimate value Vb_estm1_y of the moving speed in the Y-axis direction of the vehicle system entirety gravity center calculated by the gravity center speed estimation unit 33 was used. However, as an indicator for determining presence/absence of the turning request or the degree of the turning request, a parameter other than Vb_estm1_y may be used.

For example, as shown in the reference signs in parentheses of FIG. 8 or FIG. 9 (*a*), (*b*), the target turning angular velocity ωz_cmd_gc of the vehicle 1 may be determined by executing processing of the processing units 41, 42 similarly to the embodiments using, instead of Vb_estm1_y, the gravity center shift effect amount Vofs_y in the Y-axis direction (or the gravity center shift amount estimate value Ofst_estm_xy) calculated by the gravity center shift effect amount calculation unit 35b of the first control processing unit 24, or the post-restriction speed command V2 cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b).

Also, in this case, in the processing unit 41, the range Δa (the magnitude of the upper limit value and the lower limit value of the range Δa) of a value of an input parameter making the output value of the processing unit 41 zero and the change ratio of the output value with respect to change of a value of the input parameter outside the range Δa are set for each input parameter of each kind in general. This is similar in the processing unit 54 shown in FIG. 9 (b).

Even when such parameters as described above which substitutes for Vb_estm1_y are used, similarly to the embodiments, the vehicle 1 can be turned according to movement in the right/left direction of the upper body of the occupant.

Here, when the gravity center shift effect amount Vofs_y in the Y-axis direction calculated by the gravity center shift effect amount calculation unit 35b of the first control processing unit 24 is used instead of Vb_estm1_y, the Vofs_y is proportionate to the gravity center shift amount estimate value Ofst_estm_y in the Y-axis direction, and therefore, to set the target turning angular velocity ωz_cmd_gc of the vehicle 1 according to Vofs_y is equivalent to setting the target turning angular velocity ωz_cmd_gc of the vehicle 1 according to the gravity center shift amount estimate value Ofst_estm_y in the Y-axis direction.

Also, in the respective embodiments, the distance L3 between the center of turning and the grounding part of the first moving motion unit 3 when the vehicle 1 turned was changed according to the estimate value (observed value) Vb_estm_x of the moving speed in the front/rear direction of the vehicle system entirety gravity center, however, L3 may be a constant value determined beforehand.

Further, in the first embodiment, the target turning angular velocity ωz_cmd_gc was set to zero when the estimate value Vb_estm1_y of the moving speed in the Y-axis direction of the vehicle system entirety gravity center as the input parameter of the processing unit 41 was a value within a predetermined range Δa in the vicinity of zero, however, even when the input parameter is a value within the predetermined range Δa, the target turning angular velocity ωz_cmd_gc may be set so as to turn the vehicle 1. That is, Δa may be made zero.

Also, in the respective embodiments, one in which the second moving motion unit 4 was disposed on the rear side of the first moving motion unit 3 was shown, however, the second moving motion unit 4 may be disposed on the front side of the first moving motion unit 3. In the case, by making the moving speed in the Y-axis direction of the second moving motion unit 4 higher than the moving speed in the Y-axis direction of the first moving motion unit 3 in turning, the vehicle 1 can be turned.

In the respective embodiments, the joy stick 12 was used as an operation tool for outputting the advancing/retreating command and the transverse moving command, however, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum type vehicle, comprising:
    moving motion units configured to be capable of moving in all directions on a floor surface;
    actuator devices adapted to drive each of the moving motion units;
    a base that incorporates the moving motion units and the actuator devices;
    an occupant riding section incorporated into the base so as to be tiltable with respect to an imaginary line that extends orthogonally with respect to the floor surface;
    state detection units adapted to detect a state of the occupant riding section; and
    a control device capable of operating in a plurality of control modes, and being configured to control a motion of the actuator devices based on a detection result of the state of the occupant riding section by the state detection units,
    wherein the control device is adapted to:
    select one control mode out of the plurality of control modes of the inverted pendulum type vehicle based on the detection result of the state of the occupant riding section by the state detection units, and to:
    control the motion of the actuator devices according to the one control mode;
    said control device being configured to select the one control mode with a provision that the detection result of the state of the occupant riding section by the state detection units satisfies a designated condition and shows tilting of the occupant riding section to a designated direction.

2. The inverted pendulum type vehicle according to claim 1, wherein the control device is configured to select another control mode out of the plurality of control modes based on a detection result other than the detection result of the state of the occupant riding section by the state detection units, which becomes a motion control basis of the actuator devices.

3. The inverted pendulum type vehicle according to claim 1, wherein the control device is configured to select the one control mode based on the detection result of the state of the occupant riding section by the state detection units over a period from a start of the inverted pendulum type vehicle until when a designated period has elapsed.

4. The inverted pendulum type vehicle according to claim 1, wherein
    the control device is configured to select the one control mode with the designated condition that the detection result of the state of the occupant riding section by the state detection units shows a tilting of the occupant riding section to the designated direction by a designated angle or more.

5. The inverted pendulum type vehicle according to claim 4, wherein the control device is configured to select another of the control modes that differs according to whether the designated direction is forward or rearward as the one control mode.

6. The inverted pendulum type vehicle according to claim 1, wherein the control device is configured to select another of the control modes that differs according to whether the designated direction is forward or rearward as the one control mode.

7. The inverted pendulum type vehicle according to claim 1, wherein the control device is configured to select the one control mode out of the plurality of control modes that include:
- a beginner mode in which the motion of the actuator devices is controlled with low sensitivity with respect to steering operation of the inverted pendulum type vehicle by an occupant; and
- an expert mode in which the motion of the actuator devices is controlled with sensitivity higher than that in the beginner mode with respect to steering operation of the inverted pendulum type vehicle by the occupant.

8. An inverted pendulum type vehicle, comprising:
moving motion units configured to be capable of moving in all directions on a floor surface;
actuator devices adapted to drive each of the moving motion units;
a base that incorporates the moving motion units and the actuator devices;
an occupant riding section incorporated into the base so as to be tiltable with respect to an imaginary line that extends orthogonally with respect to the floor surface;
state detection units adapted to detect a state of the occupant riding section; and
a control device capable of operating in a plurality of control modes, and being configured to control a motion of the actuator devices based on a detection result of the state of the occupant riding section by the state detection units,
wherein the control device is adapted to:
select one control mode out of the plurality of control modes of the inverted pendulum type vehicle based on the detection result of the state of the occupant riding section by the state detection units, and to;
control the motion of the actuator devices according to the one control mode;
an indicator disposed on a front side of the base; and
said control device being configured to display the one control mode on the indicator.

9. The inverted pendulum type vehicle according to claim 8, wherein the indicator is formed of a plurality of monochrome LEDs or a multicolor LED, or a combination thereof; and
the control device is configured to execute control while differentiating a lighting condition of the plurality of monochrome LEDs or the multicolor LED, or a combination thereof according to difference in the one control mode.

\* \* \* \* \*